(12) United States Patent
Sekine

(10) Patent No.: US 8,897,960 B2
(45) Date of Patent: Nov. 25, 2014

(54) DRIVING ASSISTANCE CONTROL APPARATUS

(71) Applicant: Honda Motor Co., Ltd., Tokyo (JP)

(72) Inventor: Hiroshi Sekine, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/798,853

(22) Filed: Mar. 13, 2013

(65) Prior Publication Data

US 2013/0274996 A1 Oct. 17, 2013

(30) Foreign Application Priority Data

Apr. 13, 2012 (JP) ................................. 2012-091692

(51) Int. Cl.
| | | |
|---|---|---|
| *G06F 17/00* | (2006.01) | |
| *B60W 50/14* | (2012.01) | |
| *B60W 50/16* | (2012.01) | |
| *B60W 30/18* | (2012.01) | |

(52) U.S. Cl.
CPC ............... *G06F 17/00* (2013.01); *B60W 50/14* (2013.01); *B60W 50/16* (2013.01); *B60W 30/18145* (2013.01); *B60W 2520/125* (2013.01); *B60W 2550/146* (2013.01); *B60W 2550/402* (2013.01)
USPC ................... 701/36; 701/41; 701/44; 701/45; 340/988; 340/995.1; 340/995.14; 340/995.17

(58) Field of Classification Search
CPC ............ G60F 17/00; B60W 2520/125; B60W 2550/146; B60W 2550/402; B60W 30/18145
See application file for complete search history.

(56) References Cited

U.S. PATENT DOCUMENTS

| | | | | | |
|---|---|---|---|---|---|
| 6,141,617 | A  * | 10/2000 | Matsuda et al. | ................ | 701/72 |
| 8,032,284 | B2 * | 10/2011 | Hozumi et al. | ................ | 701/49 |
| 8,103,422 | B2 * | 1/2012 | Bradai et al. | .................... | 701/77 |
| 2006/0041372 | A1 * | 2/2006 | Kubota et al. | ................ | 701/200 |
| 2007/0100545 | A1 * | 5/2007 | Morita et al. | ................ | 701/211 |
| 2008/0042489 | A1 * | 2/2008 | Lewis et al. | .................. | 303/152 |
| 2013/0166194 | A1 * | 6/2013 | Delahaye | ..................... | 701/410 |

FOREIGN PATENT DOCUMENTS

| | | |
|---|---|---|
| JP | 08-194888 A | 7/1996 |
| JP | 2002-367098 A | 12/2002 |
| JP | 2006-131107 A | 5/2006 |

* cited by examiner

*Primary Examiner* — John R Olszewski
*Assistant Examiner* — Nicholas K Wiltey
(74) *Attorney, Agent, or Firm* — Westerman, Hattori, Daniels & Adrian, LLP

(57) ABSTRACT

A driving assistance control apparatus includes an own-vehicle position acquiring unit that acquires the position of an own vehicle; a curve information acquiring unit that acquires curve information on a driving course; a continuous curves detecting unit that detects a first curve ahead of the own vehicle and a second curve that exists at a far side of the own vehicle with respect to the first curve and that is continuous to the first curve, based on the acquired position of the own vehicle and the acquired curve information; and a curve alert control unit that controls a curve alerting unit that alerts the presence of the second curve before an entrance of the second curve. The curve alert control unit sets the alert timing of the second curve in accordance with the curve information about the first curve.

13 Claims, 13 Drawing Sheets

FIG. 15
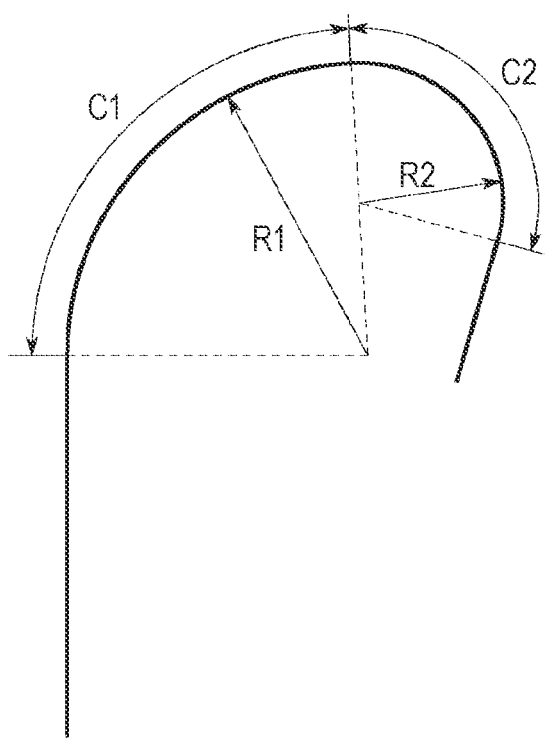
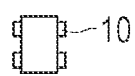

DRIVING ASSISTANCE CONTROL APPARATUS

CROSS REFERENCES TO RELATED APPLICATIONS

The present application claims priority under 35 U.S.C. §119 to Japanese Patent Application No. 2012-91692, filed Apr. 13, 2012, entitled "Driving Assistance Control Apparatus." The contents of this application are incorporated herein by reference in their entirety.

TECHNICAL FIELD

The present disclosure relates to a driving assistance control apparatus that alerts at least one of continuous curves to a driver.

BACKGROUND

In a technology disclosed in Japanese Unexamined Patent Application Publication No. 2002-367098, an allowable speed of each curve is calculated (Step S4) if multiple continuous curves exist (YES in Step S3 in FIG. 3) and a minimum allowable speed, among the allowable speeds calculated for the respective curves, is set as a target speed Vs while an own vehicle is traveling along the curves (Steps S4 to S6). If the current vehicle speed is higher than the target speed Vs (YES in Step S10 in FIG. 3), when a distance L required for retarding the vehicle to the target speed Vs which is calculated from the target speed Vs is longer than or equal to a retardation allowance distance LCA to the entrance of the curve (YES in Step S11) the target speed Vs is alerted to a driver in order to prompt the driver to perform a retardation operation before the own vehicle enters the nearest curve (S12).

As described above, in Japanese Unexamined Patent Application Publication No. 2002-367098, the minimum allowable speed, among the allowable speeds calculated for the respective continuous curves, is set as the target speed Vs while the own vehicle is traveling along the curves (Steps S4 to S6). In other words, even if the multiple continuous curves exist, the target speed is alerted only before the first curve and the target speed is the minimum allowable speed in the multiple curves in Japanese Unexamined Patent Application Publication No. 2002-367098.

Accordingly, in Japanese Unexamined Patent Application Publication No. 2002-367098, it is necessary for the driver to predict information about the continuous curves in response to the one alert and it is difficult for the driver to estimate the timing when the operation for each curve is performed.

SUMMARY

It is desirable to provide a driving assistance control apparatus capable of appropriately alerting at least one of continuous curves to a driver in order to resolve the above problem.

According to an embodiment of the present disclosure, a driving assistance control apparatus includes an own-vehicle position acquiring unit that acquires a position of an own vehicle; a curve information acquiring unit that acquires curve information on a driving course; a continuous curves detecting unit that detects a first curve that exists ahead of the own vehicle and a second curve that exists at a far side of the own vehicle with respect to the first curve and that is continuous to the first curve from the position of the own vehicle acquired by the own-vehicle position acquiring unit and the curve information acquired by the curve information acquiring unit; and a curve alert control unit that controls a curve alerting unit that alerts the presence of the second curve before an entrance of the second curve. The curve alert control unit sets the alert timing of the second curve in accordance with the curve information about the first curve.

With the above configuration, it is possible to alert the presence of the second curve following the first curve. In addition, since the alert timing of the second curve is set in accordance with the curve information about the first curve, the presence of the second curve is alerted in consideration of the effect of the first curve. Accordingly, it is possible to appropriately alert the presence of the second curve to the driver.

The curve alert control unit may advance the alert timing of the second curve with the increasing degree of curve of the first curve. Alternatively, the curve alert control unit may advance the alert timing of the second curve with the decreasing radius of the first curve or with the increasing curvature of the first curve. In this case, when the first curve is sharp, the driver recognizes the presence of the second curve in an earlier stage. Accordingly, it is possible for the driver to prepare the second curve in the earlier stage to improve the safety.

The driving assistance control apparatus may further include a recommended vehicle speed setting unit that sets a recommended vehicle speed at an entrance of the first curve; and an estimated lateral acceleration acquiring unit that acquires an estimated lateral acceleration estimated to occur when the own vehicle travels through the first curve on the basis of the recommended vehicle speed set by the recommended vehicle speed setting unit and the curve information about the first curve. The curve alert control unit may advance the alert timing of the second curve with the increasing estimated lateral acceleration for the first curve acquired by the estimated lateral acceleration acquiring unit.

In this case, information of how the first curve is sharp is acquired on the basis of the estimated lateral acceleration estimated to occur when the own vehicle travels through the first curve. Consequently, it is possible to set the alert timing of the second curve on the basis of the above information to appropriately alert the second curve to the driver before the own vehicle travels along the second curve.

The curve alert control unit may not alert the second curve if a radius of the first curve is smaller than that of the second curve or if a curvature of the first curve is higher than that of the second curve. When the first curve is sharper than the second curve, the retardation operation, etc. for the first curve by the driver in response to the alert of the first curve probably produces a traveling state that is capable of supporting the second curve. Accordingly, no alert for the second curve allows the inconvenience of the driver due to the alert to be reduced.

The curve alerting unit may alert the presence of the first curve before an entrance of the first curve. The curve alert control unit may set the alert timing of the first curve in accordance with the curve information about the second curve. In this case, since the alert timing of the first curve is set in accordance with the curve information about the second curve, the presence of the first curve is alerted in consideration of the effect of the second curve. Consequently, it is possible to more appropriately alert the presence of the first curve to the driver.

The curve alert control unit may advance the alert timing of the first curve with the decreasing radius of the second curve or with the increasing curvature of the second curve. In this case, it is possible to alert to the driver that more attention is necessary, compared with a case in which a single curve exists ahead of the own vehicle.

The curve alert control unit may correct at least one of the recommended vehicle speed at the entrance of the second curve and a recommended retardation to achieve the recommended vehicle speed on the basis of the curve information about the first curve and may set an alert distance from the entrance of the second curve to a position where the second curve is alerted in accordance with the corrected recommended vehicle speed or the corrected recommended retardation. In this case, the alert distance for the second curve is set in consideration of the first curve. Consequently, it is possible to more appropriately set the alert timing of the second curve.

The curve alert control unit may move an alert start position, which is based on the alert distance set in accordance with the corrected recommended vehicle speed or the corrected recommended retardation, to an entrance of the first curve or before the first curve if the alert start position is within the first curve. In this case, the alert of the second curve is not made while the own vehicle is traveling along the first curve and the driver is easy to drive the vehicle while the own vehicle is traveling along the first curve. In addition, even when the first curve is sharp, it is possible to alert the presence of the second curve to the driver before the own vehicle enters the first curve.

The driving assistance control apparatus may further include a curve length acquiring unit that acquires a length of the first curve. The alert start position within the first curve may be used if the length of the first curve is greater than or equal to a certain value even when the alert start position based on the alert distance set in accordance with the corrected recommended vehicle speed or the corrected recommended retardation is within the first curve. When the first curve is relatively long, the alert of the second curve before the first curve can reduce the recognition that the second curve is alerted while the own vehicle is traveling along the first curve. Accordingly, if the length of the first curve is greater than or equal to the certain value, the alert of the second curve while the own vehicle is traveling along the first curve may allow the driver to appropriately recognize the second curve.

The driving assistance control apparatus may further include a reaction force generating unit that generates alerting reaction force against an acceleration pedal as the alert of the first curve or the second curve. The curve alert control unit may increase the alerting reaction force with the increasing sharpness of the first curve or the second curve and may make the alerting reaction force for the first curve greater than that for the second curve. In this case, the alerting reaction force against the acceleration pedal is increased with the increasing sharpness of the first curve or the second curve to allow the driver to recognize the degree of curve of the first curve or the second curve. In addition, when the pedal reaction force for the first curve is caused, the driver has already recognized the presence of the first curve. In this case, making the pedal reaction force for the second curve smaller than the pedal reaction force for the first curve allows the inconvenience of the driver to be reduced.

According to the embodiments, it is possible to alert the presence of the second curve following the first curve. In addition, since the alert timing of the second curve is set in accordance with the curve information about the first curve, the presence of the second curve is alerted in consideration of the effect of the first curve. Accordingly, it is possible to more appropriately alert the presence of the second curve to the driver.

BRIEF DESCRIPTION OF THE DRAWINGS

The advantages of the disclosure will become apparent in the following description taken in conjunction with the following drawings.

FIG. 15 illustrates an example of the first curve and the second curve having the same direction of turn.

DETAILED DESCRIPTION

A. First Embodiment

1. Configuration of Vehicle 10

[1-1. Entire Configuration]

Figure 1:
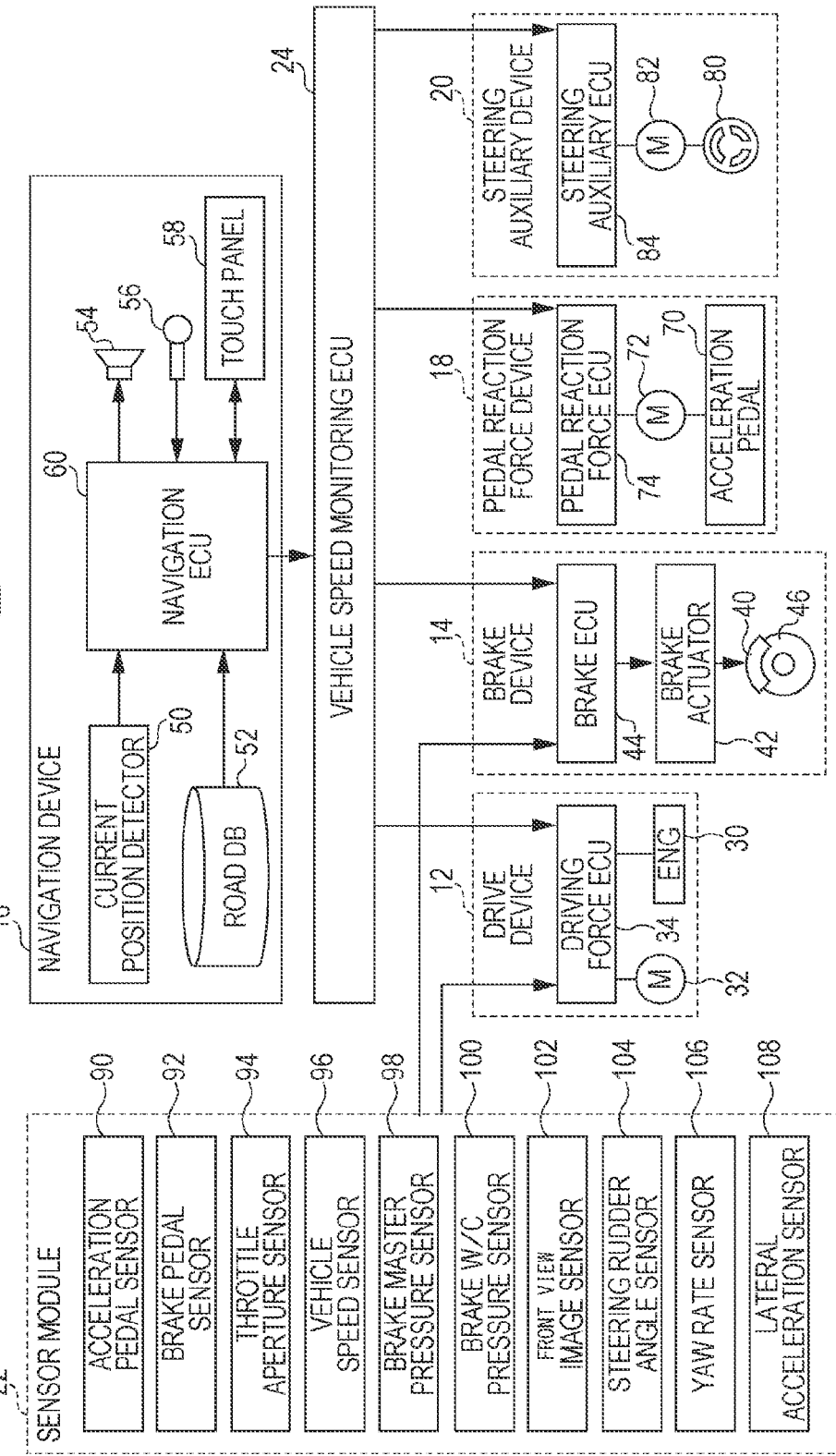
FIG. 1 is a block diagram of a vehicle in which a vehicle speed monitoring electronic control unit (hereinafter referred to as a "vehicle speed monitoring ECU") operating as a driving assistance control apparatus according to a first embodiment of the present disclosure is mounted.

FIG. 1 is a block diagram of a vehicle 10 in which a vehicle speed monitoring electronic control unit 24 (hereinafter referred to as a "vehicle speed monitoring ECU 24" or an "ECU 24") is mounted. The vehicle speed monitoring ECU 24 operates as a driving assistance control apparatus according to a first embodiment of the present disclosure. The vehicle 10 is a four-wheeled vehicle operating as a so-called hybrid vehicle. The vehicle 10 may be a gasoline engine vehicle, a diesel engine vehicle, or an electric automobile (including a fuel cell vehicle) which does not include an engine. The vehicle 10 may be a two-wheeled vehicle, a three-wheeled vehicle, a six-wheeled vehicle, or the like.

Referring to FIG. 1, the vehicle 10 includes a drive device 12, a brake device 14, a navigation device 16, a pedal reaction force device 18, a steering auxiliary device 20, and a sensor module 22, in addition to the vehicle speed monitoring ECU 24.

[1-2. Drive Device 12]

The drive device 12 includes an engine 30, a traction motor 32, and a driving force electronic control unit 34 (hereinafter referred to as a "driving force ECU 34"). The traction motor 32 generates driving force for the vehicle 10 during powering and generates regenerative electric power with a regenerative brake during regeneration. The driving force ECU 34 controls outputs from the engine 30 and the traction motor 32 in response to an operation by a driver with, for example, an acceleration pedal 70.

In the present embodiment, when the vehicle 10 is approaching a curve, the output from the traction motor 32 may be temporarily varied to alert the presence of the curve to the driver.

The driving force ECU 34 includes an input-output part, an arithmetic part, and a storage part although not illustrated in FIG. 1. The same applies to the other ECUs described below.

[1-3. Brake Device 14]

The brake device 14 includes a wheel cylinder 40, a brake actuator 42, and a brake electronic control unit 44 (hereinafter referred to as a "brake ECU 44"). The brake ECU 44 applies braking force to a wheel 46 via the brake actuator 42 and the wheel cylinder 40 in accordance with, for example, an operation with a brake pedal (not illustrated) or the degree of proximity to a leading vehicle. Although only one wheel 46 and only one wheel cylinder 40 are illustrated in FIG. 1, the brake device 14 practically includes four wheels 46 and four wheel cylinders 40 because the vehicle 10 of the first embodiment is a four-wheeled vehicle.

The brake actuator 42 includes a master cylinder, an IN valve, an OUT valve, a regulator valve, a suction valve, a pump, a pump motor, a reservoir, a damper room, a check valve, a pressure gauge, and so on (not illustrated).

In the present embodiment, when the vehicle 10 is approaching a curve, the braking force from the brake device 14 may be temporarily varied to alert the presence of the curve to the driver.

[1-4. Navigation Device 16]

The navigation device 16 includes a current position detector 50, a road database 52 (hereinafter referred to as a "road DB 52"), a speaker 54, a microphone 56, a touch panel 58, and a navigation electronic control unit 60 (hereinafter referred to as a "navigation ECU 60"). The navigation ECU 60 may perform or provide various functions such as those described in the present application by means of a processor such as a CPU which executes a program. In the present application, the term program generally refers to a set of coded instructions that enable a computer to perform a specified function. Programs may be generally stored on a storage device such as memory. Further, programs may be implemented internally or externally to a system, while remaining accessible by that system.

The current position detector 50 detects the current position (the own vehicle position) of the vehicle (hereinafter also referred to as the "own vehicle 10"). The current position detector 50 includes, for example, a Global Positioning System (GPS) receiver, communication equipment with each beacon on roads, and a gyro sensor. The road DB 52 includes a variety of road information (including the radius, the curvature, the length, the angle, etc. of each curve).

The speaker 54 outputs sound when the navigation device 16 provides route guidance. The speaker 54 may be shared with an audio device (not illustrated). The microphone 56 is used by a user (the driver or a passenger) to input voice for the route guidance. The touch panel 58 functions as a display part that displays a planned route of the vehicle 10 and functions as an input part that accepts an instruction from the user.

The navigation ECU 60 provides the route guidance via the speaker 54 and the touch panel 58 on the basis of the current position (the own vehicle position) detected by the current position detector 50, the road information in the road DB 52, and the information input with the microphone 56 or the touch panel 58.

In the present embodiment, the determination of whether the vehicle 10 is approaching a curve is based on the information acquired by the navigation device 16. In addition, in the present embodiment, when the vehicle 10 is approaching a curve, the presence of the curve may be alerted to the driver with a warning tone from the speaker 54 or a warning displayed on the touch panel 58.

[1-5. Pedal Reaction Force Device 18]

The pedal reaction force device 18 includes a reaction force motor 72 that applies pedal reaction force to the acceleration pedal 70 and a pedal reaction force electronic control unit 74 (hereinafter referred to as a "pedal reaction force ECU 74") that controls the reaction force motor 72. The pedal reaction force ECU 74 controls the pedal reaction force on the basis of, for example, the speed (hereinafter referred to as a "vehicle speed V0" or a "current vehicle speed V0") [km/h] of the vehicle 10.

In the present embodiment, when the vehicle 10 is approaching a curve, the pedal reaction force from the reaction force motor 72 may be temporarily varied (increased) to alert the presence of the curve to the driver.

[1-6. Steering Auxiliary Device 20]

The steering auxiliary device 20 includes a vibration motor 82 that applies vibration or the like to a steering wheel 80 and a steering auxiliary electronic control unit 84 (hereinafter referred to as a "steering auxiliary ECU 84"). The steering auxiliary ECU 84 controls the vibration or the like by the vibration motor 82 on the basis of, for example, the degree of proximity of the own vehicle 10 to a forward vehicle.

In the present embodiment, when the vehicle 10 is approaching a curve, the vibration or the like from the vibration motor 82 may be temporarily applied to alert the presence of the curve to the driver.

[1-7. Sensor Module 22]

As illustrated in FIG. 1, the sensor module 22 includes an acceleration pedal sensor 90, a brake pedal sensor 92, a throttle aperture sensor 94, a vehicle speed sensor 96, a brake master pressure sensor 98, a brake wheel cylinder pressure sensor 100, a front view image sensor 102, a steering rudder angle sensor 104, a yaw rate sensor 106, and a lateral acceleration sensor 108 (hereinafter referred to as a "lateral G sensor 108").

The acceleration pedal sensor 90 detects the amount of operation of the acceleration pedal 70. The brake pedal sensor 92 detects the amount of operation of the brake pedal (not illustrated). The throttle aperture sensor 94 detects the aperture of a throttle valve (not illustrated) of the engine 30. The vehicle speed sensor 96 detects the vehicle speed V0 of the vehicle 10. The brake master pressure sensor 98 detects the pressure (master pressure) in a negative pressure chamber of a brake booster (not illustrated). The brake wheel cylinder pressure sensor 100 (illustrated as "brake W/C pressure sensor 100" in FIG. 1) detects the pressure (wheel cylinder pressure or W/C pressure) in the wheel cylinder 40.

The front view image sensor 102 acquires an image ahead of the vehicle 10 to detect, for example, the content of an obstacle (a leading vehicle, a curve, etc.) ahead of the vehicle 10 and the distance to the obstacle. The steering rudder angle sensor 104 detects the rudder angle of the steering wheel 80. The yaw rate sensor 106 detects the yaw rate of the vehicle 10. The lateral G sensor 108 detects the lateral acceleration of the vehicle 10.

Each sensor included in the sensor module 22 may function as part of the other components in FIG. 1. For example, the acceleration pedal sensor 90 may be included in the drive device 12 and the pedal reaction force device 18. The vehicle speed sensor 96 may be combined with the gyro sensor included in the current position detector 50 to be included in the navigation device 16 as a component to be used to detect the current position of the vehicle 10 in inertial navigation.

[1-8. Vehicle Speed Monitoring ECU 24]

The vehicle speed monitoring ECU 24 monitors the vehicle speed V0 of the vehicle 10 to provide (alert) a variety of information to attract the driver's attention or perform driving assistance control for the driver, if necessary.

Figure 2:
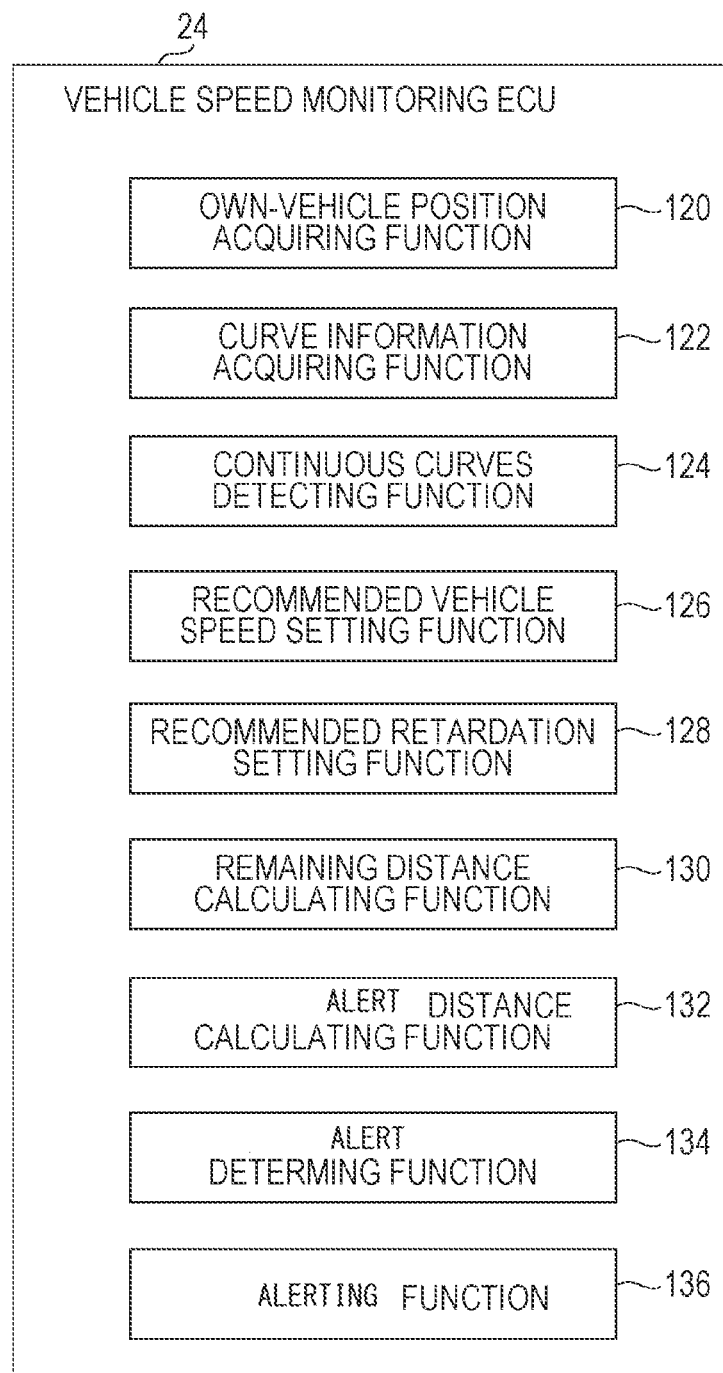
FIG. 2 is a functional block diagram of the vehicle speed monitoring ECU.

FIG. 2 is a functional block diagram of the vehicle speed monitoring ECU 24. Referring to FIG. 2, the vehicle speed monitoring ECU 24 includes an own-vehicle position acquiring function 120, a curve information acquiring function 122, a continuous curves detecting function 124, a recommended vehicle speed setting function 126, a recommended retardation setting function 128, a remaining distance calculating function 130, an alert distance calculating function 132, an alert determining function 134, and an alerting function 136. These functions will be described below with reference to FIG. 3 and so on. The vehicle speed monitoring ECU 24 may perform or provide various functions or process or control process such as those described in the present application by means of a processor such as a CPU which executes a program. In the present application, the term program generally refers to a set of coded instructions that enable a computer to perform a specified function. Programs may be generally stored on a storage device such as memory. Further, programs may be implemented internally or externally to a system, while remaining accessible by that system.

2. Curve Alert Control in First Embodiment

[2-1. Overview]

Figure 3:
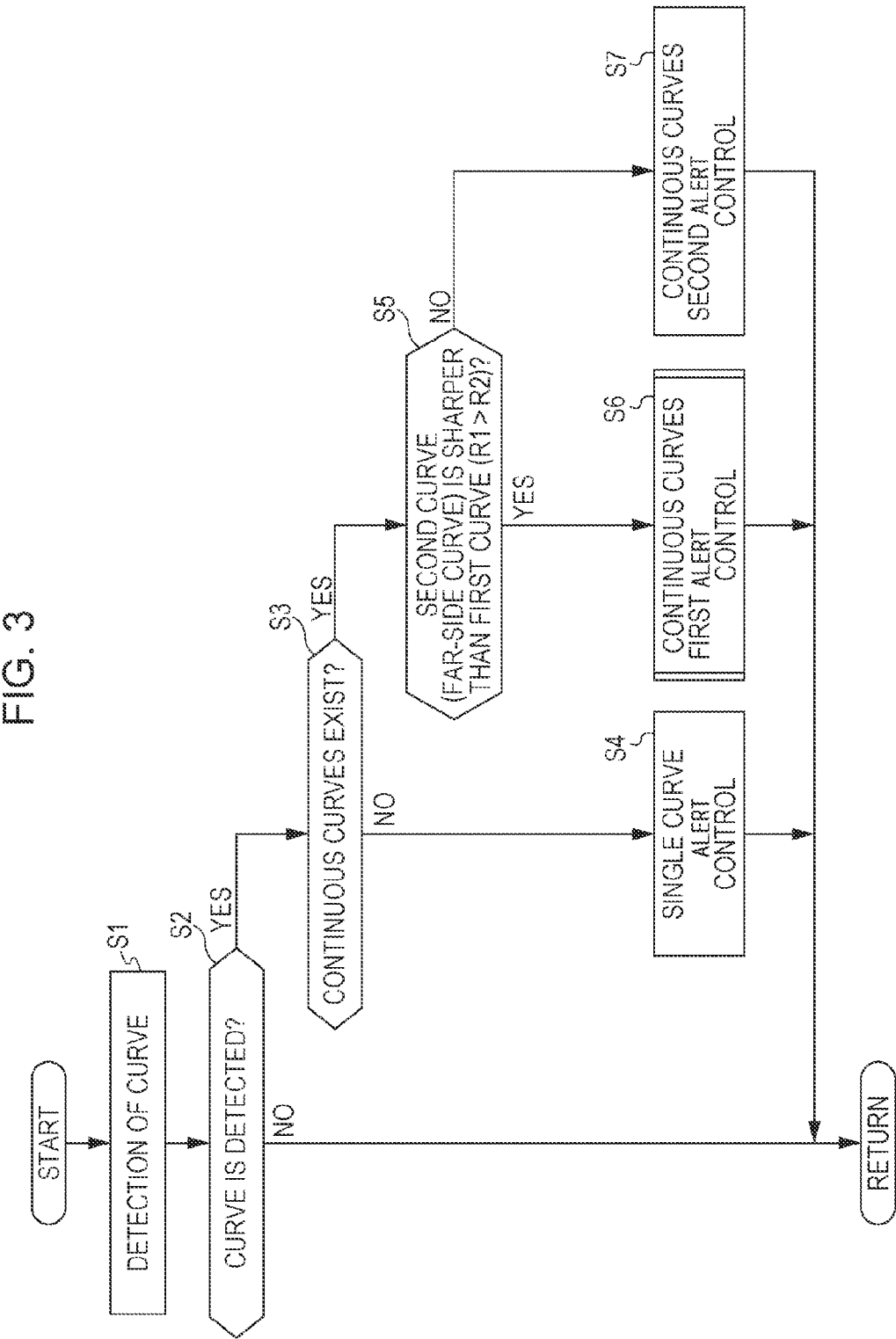
FIG. 3 is a flowchart illustrating an overview of a curve alert control process according to the first embodiment.

FIG. 3 is a flowchart illustrating an overview of a curve alert control process according to the first embodiment. Referring to FIG. 3, in Step S1, the ECU 24 performs curve detection to detect whether a single curve or multiple curves exist on the planned route of the own vehicle 10.

In Step S2, the ECU 24 determines whether at least one curve is detected as the result of the curve detection in Step S1. If no curve is detected (NO in Step S2), the curve alert control (any of Steps S4, S6, and S7 described below) is not performed in the current arithmetic process and the process goes back to Step S1 for the next arithmetic process.

If at least one curve is detected (YES in Step S2), in Step S3, the ECU 24 (the continuous curves detecting function 124) determines whether multiple continuous curves (hereinafter also referred to as "continuous curves") exist as the result of the curve detection (Step S1). The "continuous" means a case in which, for example, the position where alert of the presence of a far-side curve (hereinafter referred to as a "second curve") is started is located before (closer to the own vehicle 10) a near-side curve (hereinafter referred to as a "first curve") or within the first curve.

If the continuous curves do not exist (NO in Step S3), in Step S4, the ECU 24 performs single curve alert control used for a single curve. The single curve alert control alerts the presence of a single curve. The single curve alert control will be described below. If the continuous curves exist (YES in Step S3), the process goes to Step S5.

In Step S5, the ECU 24 (the continuous curves detecting function 124) determines whether the second curve is sharper than the first curve in the continuous curves. For example, the radius or curvature of the first curve is compared with the radius or curvature of the second curve to perform the determination.

If the second curve is sharper than the first curve (YES in Step S5), in Step S6, the ECU 24 performs continuous curves first alert control. If the second curve is not sharper than the first curve (NO in Step S5), in Step S7, the ECU 24 performs continuous curves second alert control.

[2-2. Curve Detection (Step S1 in FIG. 3)]

In the curve detection, the ECU 24 inquires of the navigation device 16 whether a single curve or multiple curves exist on the planned route of the own vehicle 10. The navigation device 16 determines whether a single curve or multiple curves exist on the planned route of the own vehicle 10 on the basis of, for example, the current position of the own vehicle 10, the planned route of the own vehicle 10, and/or the road information and supplies the result of the determination to the ECU 24.

Image information from the front view image sensor 102, image information from a laser radar (not illustrated), information acquired from a leading vehicle by communication, etc. may be used, instead of the information from the navigation device 16.

[2-3. Single Curve Alert Control (Step S4 in FIG. 3)]

Figure 4:
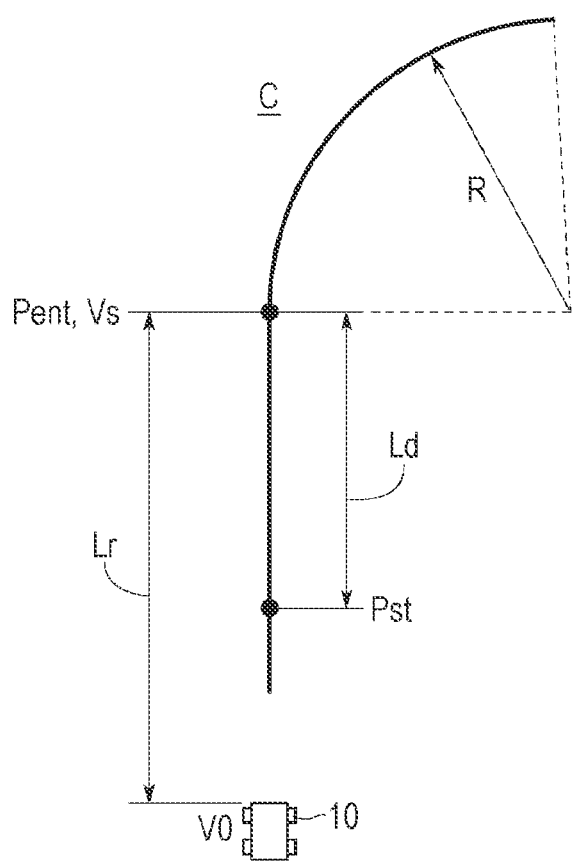
FIG. 4 is a diagram for describing single curve alert control according to the first embodiment.

FIG. 4 is a diagram for describing the single curve alert control according to the first embodiment. Reference numerals are defined as follows in FIG. 4:

Pst: Alert start position of curve C
Pent: Entrance of curve C
R: Radius of curve C
Lr: Distance to curve C
Ld: Alert distance for curve C The alert start position Pst is a position where the alert of the presence of the curve C to the driver is started. The distance Lr is the distance between the entrance-of-curve Pent and the own vehicle position. The alert distance Ld is the distance between the entrance-of-curve Pent and the alert start position Pst. In the present embodiment, although the presence of the curve C is alerted when the own vehicle 10 reaches the alert start position Pst, the alert is not continued. In other words, it is noted that the alert is not continued even if the own vehicle 10 is within the alert distance Ld.

In the present embodiment, a recommended vehicle speed Vs is used as a recommend vehicle speed (target vehicle speed) when the own vehicle 10 reaches the entrance Pent of the curve C (hereinafter also referred to as the "entrance-of-curve Pent").

Provided that a recommended retardation when the own vehicle 10 decreases its speed from the current vehicle speed V0 to the recommended vehicle speed Vs is denoted by Ds, the relationship between the current vehicle speed V0, the recommended vehicle speed Vs, the recommended retardation Ds, and the alert distance Ld is represented according to Equations (1) and (2):

$$Ds = (V0 - Vs)/t \quad (1)$$

$$Ld = V0 * t - \{(Ds * t^2)/2\} \quad (2)$$

In Equations (1) and (2), t denotes time. Specifically, in Equation (1), t denotes the time necessary to change the current vehicle speed V0 to the recommended vehicle speed Vs. In Equation (2), t denotes the time necessary to make the current vehicle speed V0 equal to the recommended vehicle speed Vs at the entrance-of-curve Pent.

Substitution of Equation (1) into Equation (2) so that t is excluded results in Equation (3):

$$Ld=(V0^2-Vs^2)/(2*Ds) \quad (3)$$

Modification of Equation (3) results in the recommended retardation Ds and the recommended vehicle speed Vs that are represented by Equations (4) and (5):

$$Ds=(V0^2-Vs^2)/(2*Ld) \quad (4)$$

$$Vs=\sqrt{\{V0^2-(2*Ds*Ld)\}} \quad (5)$$

Equations (1) to (5) show that the recommended vehicle speed Vs, the recommended retardation Ds, the time t, and the alert distance Ld are associated with each other and are capable of being arbitrarily set by a designer.

In the first embodiment, the current vehicle speed V0 is acquired from the vehicle speed sensor 96. The recommended vehicle speed Vs and the recommended retardation Ds are set in accordance with the information about the curve C from the navigation device 16. Then, the current vehicle speed V0, the recommended vehicle speed Vs, and the recommended retardation Ds are substituted into Equation (3) to set the alert distance Ld.

[2-4. Continuous Curves First Alert Control (Step S6 in FIG. 3)]
(2-4-1. Idea)
(2-4-1-1. Definition)

Figure 5:
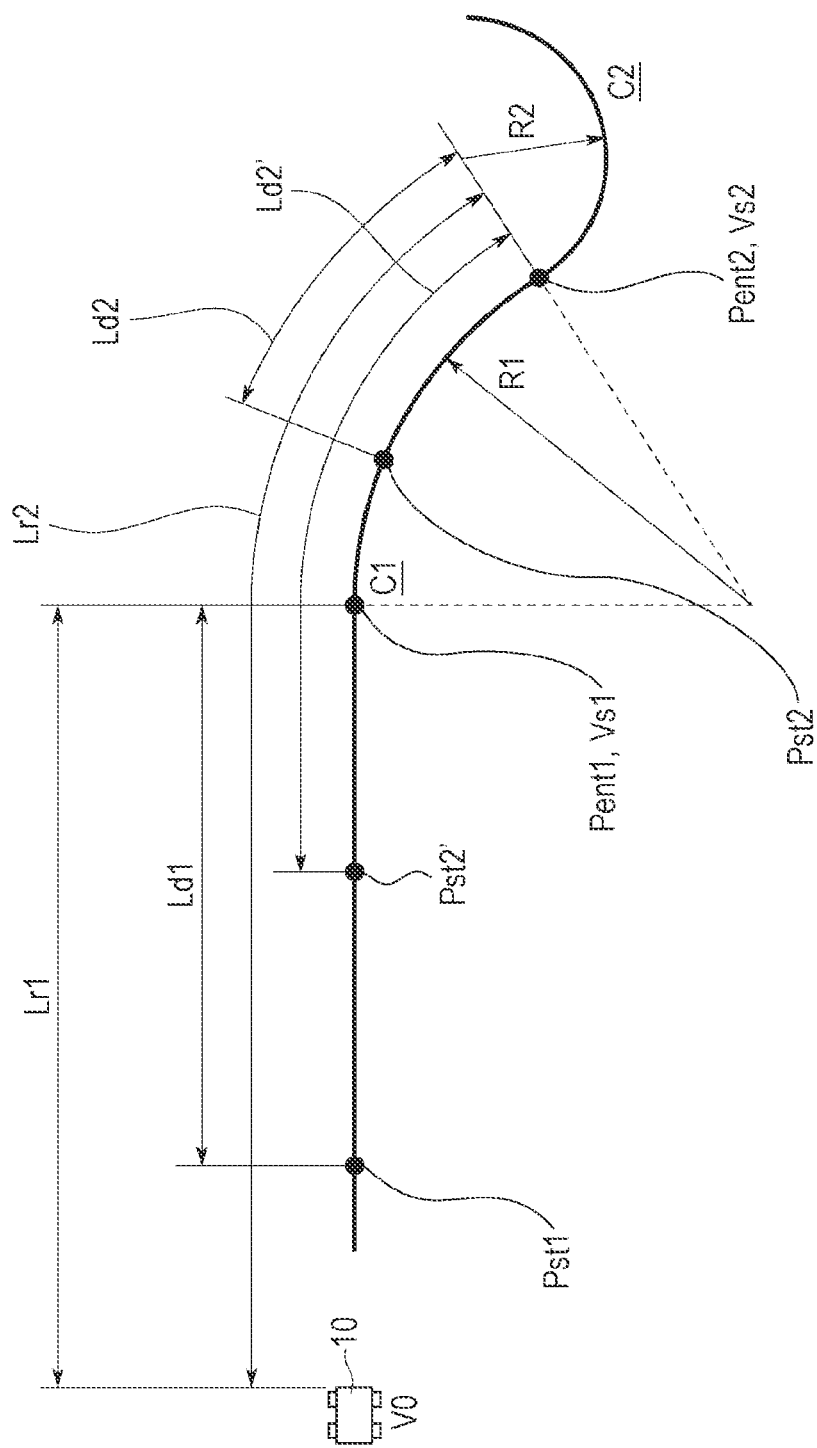
FIG. 5 is a diagram for describing continuous curves first alert control according to the first embodiment.

FIG. 5 is a diagram for describing the continuous curves first alert control according to the first embodiment. Reference numerals are defined as follows in FIG. 5:

Pst1: Alert start position for first curve C1
Pst2: Alert start position for second curve C2 before correction
Pst2': Alert start position for second curve C2 after correction
Pent1: Entrance of first curve C1
Pent2: Entrance of second curve C2
R1: Radius of first curve C1
R2: Radius of second curve C2
Lr1: Distance to first curve C1
Lr2: distance to second curve C2
Ld1: Alert distance for first curve C1
Ld2: Alert distance for second curve C2 before correction
Ld2': Alert distance for second curve C2 after correction (2-4-1-2. Description)

As illustrated in FIG. 5, the alert start position Pst2 for the second curve C2 is moved toward the own vehicle 10 to set the second curve alert start position after correction Pst2' and the alert distance Ld2 for the second curve C2 is lengthened to set the second curve alert distance after correction Ld2' in the first embodiment. These corrections are performed on the basis of curve information about the first curve C1 (e.g., the degree of curve of the first curve C1 here). Accordingly, it is possible to alert the presence of the second curve C2 in consideration of the effect of the first curve C1.

(2-4-2. Specific Flow)

Figure 6:
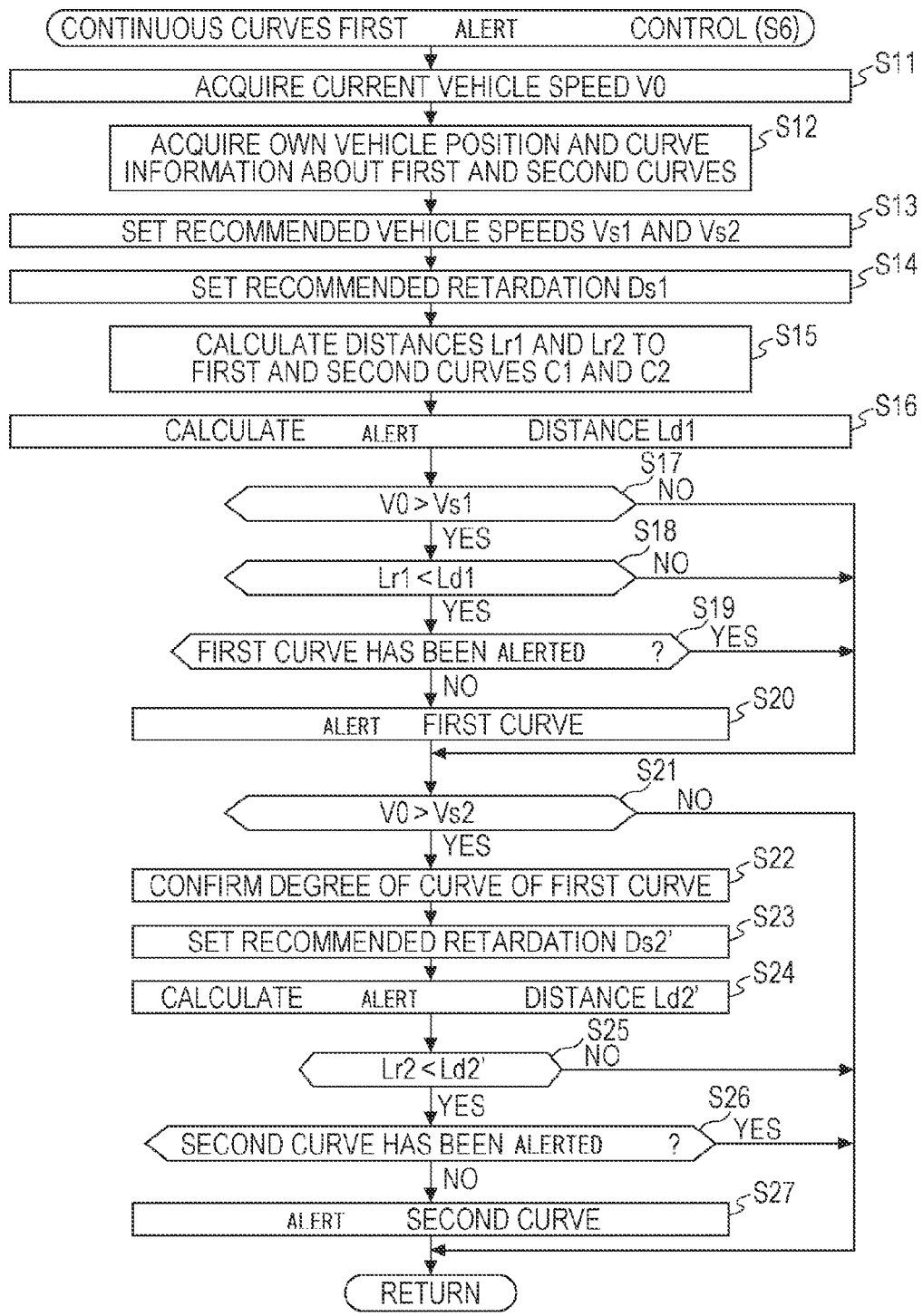
FIG. 6 is a flowchart illustrating an exemplary process of the continuous curves first alert control according to the first embodiment.

FIG. 6 is a flowchart illustrating an exemplary process of the continuous curves first alert control (Step S6 in FIG. 3) according to the first embodiment. Referring to FIG. 6, in Step S11, the ECU 24 acquires the current vehicle speed V0 from the vehicle speed sensor 96.

In Step S12, the ECU 24 (the own-vehicle position acquiring function 120 and the curve information acquiring function 122) acquires the position of the own vehicle 10 and the curve information about the first curve C1 and the second curve C2 from the navigation device 16. The curve information includes the entrance-of-first-curve-C1 Pent1, the entrance-of-second-curve-C2 Pent2, the radius R1 of the first curve C1, the radius R2 of the second curve C2, and a legally permitted speed.

In Step S13, the ECU 24 (the recommended vehicle speed setting function 126) sets recommended vehicle speeds Vs1 and Vs2. The recommended vehicle speed Vs1 is a vehicle speed recommended when the own vehicle 10 travels along the first curve C1 and the recommended vehicle speed Vs2 is a vehicle speed recommended when the own vehicle 10 travels along the second curve C2. In the present embodiment, it is assumed that the vehicle speed V0 is decreased to a value lower than or equal to the recommended vehicle speed Vs1 when the own vehicle 10 reaches the entrance-of-first-curve-C1 Pent1 and that the vehicle speed V0 is decreased to a value lower than or equal to the recommended vehicle speed Vs2 when the own vehicle 10 reaches the entrance-of-second-curve-C2 Pent2. The recommended vehicle speeds Vs1 and Vs2 are set on the basis of, for example, recommended vehicle speeds (curve standard recommended speeds) based on the radius R1 of the first curve C1 and the radius R2 of the second curve C2 or the legally permitted speed.

In Step S14, the ECU 24 (the recommended retardation setting function 128) sets a recommended retardation Ds1 for the first curve C1. Although the recommended retardation Ds1 is represented according to Equation (1) or Equation (4), as described above, the recommended retardation Ds1 is set to, for example, a fixed value in the present embodiment.

A recommended retardation Ds2 for the second curve C2, which is set in the same manner as in the recommended retardation Ds1 for the first curve C1, is not set in Step S14. This is because a recommended retardation Ds2' resulting from correction of the recommended retardation Ds2 is set in Step S23 described below.

In Step S15, the ECU 24 (the remaining distance calculating function 130) calculates the distance Lr1 to the first curve C1 and the distance Lr2 to the second curve C2. The distance Lr1 to the first curve C1 is calculated by calculating the distance between the own vehicle position and the entrance-of-first-curve-C1 Pent1 and the distance Lr2 to the second curve C2 is calculated by calculating the distance between the own vehicle position and the entrance-of-second-curve-C2 Pent2.

In Step S16, the ECU 24 (the alert distance calculating function 132) calculates the alert distance Ld1 for the first curve C1. Specifically, the current vehicle speed V0 acquired in Step S11, the recommended vehicle speed Vs1 set in Step S13, and the recommended retardation Ds1 set in Step S14 are substituted into Equation (3) to calculate the alert distance Ld1.

The alert distance Ld2 for the second curve C2 is not calculated in the same manner as in the alert distance Ld1 for the first curve C1 in Step S16. This is because the alert distance Ld2' resulting from correction of the alert distance Ld2 is calculated in Step S24 described below.

In Step S17, the ECU 24 (the alert determining function 134) determines whether the current vehicle speed V0 exceeds the recommended vehicle speed Vs1 for the first curve C1. If the current vehicle speed V0 does not exceed the recommended vehicle speed Vs1 for the first curve C1 (NO in Step S17), the process goes to Step S21. If the current vehicle speed V0 exceeds the recommended vehicle speed Vs1 for the first curve C1 (YES in Step S17), the process goes to Step S18.

In Step S18, the ECU 24 (the alert determining function 134) determines whether the distance Lr1 to the first curve C1 is shorter than the alert distance Ld1. If the distance Lr1 is not shorter than the alert distance Ld1 (NO in Step S18), the process goes to Step S21. If the distance Lr1 is shorter than the alert distance Ld1 (YES in Step S18), the process goes to Step S19.

In Step S19, the ECU 24 (the alert determining function 134) determines whether the first curve C1 has been alerted. The determination may be performed by using a flag indicating whether the first curve C1 has been alerted.

If the first curve C1 has not been alerted (NO in Step S19), in Step S20, the ECU 24 (the alerting function 136) causes the first curve C1 to be alerted. Specifically, the ECU 24 (the alerting function 136) causes the presence of the first curve C1 to be alerted to the driver by an alert method that is set in advance. For example, at least one of temporary change (for example, decrease) in the number of revolutions of the engine 30 or the traction motor 32, temporary automatic braking with the brake device 14, output of a warning tone from the speaker 54, display of a warning on the touch panel 58, temporary change (for example, increase) in the pedal reaction force against the acceleration pedal 70, and temporary application of vibration to the steering wheel 80 may be used as the alert method that is set in advance.

When the temporary change in the pedal reaction force against the acceleration pedal 70 is used, the vehicle speed monitoring ECU 24 may increase the pedal reaction force as the first curve C1 becomes sharper. This allows the driver to recognize the degree of curve of the first curve C1.

The pedal reaction force for the first curve C1 may be made greater than the pedal reaction force for the second curve C2 in Step S27 described below. When the pedal reaction force for the first curve C1 is caused, the driver has already recognized the presence of the first curve C1. In this case, making the pedal reaction force for the second curve C2 smaller than the pedal reaction force for the first curve C1 allows less inconvenience of the driver.

The same applies to the temporary change in the number of revolutions of the engine 30 or the traction motor 32, the temporary automatic braking with the brake device 14, the output of a warning tone from the speaker 54, the display of a warning on the touch panel 58, and the temporary application of vibration to the steering wheel 80. In other words, the degree of alert for the first curve C1 may be higher than the degree of alert for the second curve C2.

If the first curve C1 has been alerted (YES in Step S19), the process goes to Step S21.

In Step S21, the ECU 24 (the alert determining function 134) determines whether the current vehicle speed V0 exceeds the recommended vehicle speed Vs2 for the second curve C2. If the current vehicle speed V0 does not exceed the recommended vehicle speed Vs2 for the second curve C2 (NO in Step S21), the current arithmetic process is terminated. If the current vehicle speed V0 exceeds the recommended vehicle speed Vs2 for the second curve C2 (YES in Step S21), the process goes to Step S22.

In Step S22, the ECU 24 (the recommended retardation setting function 128) confirms the degree of curve of the first curve C1. For example, the radius R1 of the first curve C1 may be used as the degree of curve of the first curve C1. Alternatively, a quotient R1/R2 resulting from division of the radius R1 of the first curve C1 by the radius R2 of the second curve C2 may be used as the degree of curve of the first curve C1. Alternatively, a difference R1-R2 between the radius R1 of the first curve C1 and the radius R2 of the second curve C2 may be used as the degree of curve of the first curve C1. The radius R1 and the radius R2 may be acquired from the curve information from the navigation device 16.

As described above, the second curve C2 is sharper than the first curve C1 in the continuous curves first alert control (refer to Steps S5 and S6 in FIG. 3). Accordingly, the quotient R1/R2 is equal to a positive value greater than one and the difference R1-R2 is equal to a positive value.

In Step S23, the ECU 24 (the recommended retardation setting function 128) sets the recommended retardation Ds2' for the second curve C2 on the basis of the degree of curve of the first curve C1. As described above, the recommended retardation Ds2' is a value resulting from correction of the recommended retardation Ds2 for the second curve C2, which is set in the same manner as in the recommended retardation Ds1 for the first curve C1 in Step S14.

Figure 7:
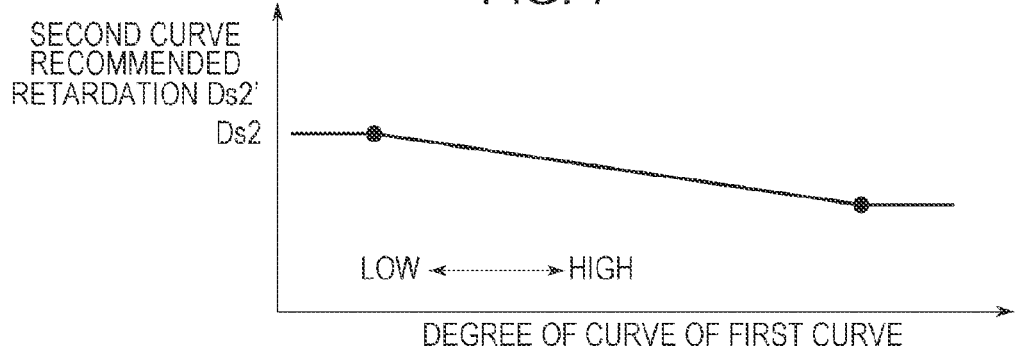
FIG. 7 illustrates an example of the relationship between a degree of curve of a first curve and a recommended retardation for a second curve.

FIG. 7 illustrates an example of the relationship between the degree of curve of the first curve C1 and the recommended retardation Ds2' for the second curve C2. As illustrated in FIG. 7, the recommended retardation Ds2' is decreased with the increasing degree of curve of the first curve C1. Accordingly, when the degree of curve of the first curve C1 is higher, the alert distance Ld2' for the second curve C2 is further lengthened as the result of processing described below to alert the second curve C2 earlier.

Referring back to FIG. 6, in Step S24, the ECU 24 (the alert distance calculating function 132) calculates the alert distance Ld2' for the second curve C2. Specifically, the current vehicle speed V0 acquired in Step S11, the recommended vehicle speed Vs2 set in Step S13, and the recommended retardation Ds2' set in Step S23 are substituted into Equation (3) to calculate the alert distance Ld2'.

As described above, since the degree of curve of the first curve C1 is reflected in the recommended retardation Ds2', the degree of curve of the first curve C1 is reflected also in the alert distance Ld2'. In other words, the alert distance Ld2' practically results from correction of the alert distance Ld2 in accordance with the degree of curve of the first curve C1. As described below, the alert distance Ld2' for the second curve C2 may be set by another method.

In Step S25, the ECU 24 (the alert determining function 134) determines whether the distance Lr2 to the second curve C2 is shorter than the alert distance Ld2' calculated in Step S24. If the distance Lr2 to the second curve C2 is not shorter than the alert distance Ld2' (NO in Step S25), the current arithmetic process is terminated. If the distance Lr2 is shorter than the alert distance Ld2' (YES in Step S25), the process goes to Step S26.

In Step S26, the ECU 24 (the alert determining function 134) determines whether the second curve C2 has been alerted. The determination may be performed by using a flag indicating whether the second curve C2 has been alerted. If the second curve C2 has been alerted (YES in Step S26), the current arithmetic process is terminated. If the second curve C2 has not been alerted (NO in Step S26), in Step S27, the ECU 24 (the alerting function 136) causes the second curve C2 to be alerted. The specific method of alerting the second curve C2 is the same as the method of alerting the first curve C1 (Step S20).

However, as described above, the pedal reaction force for the first curve C1 may be made greater than the pedal reaction force for the second curve C2 in Step S27. When the pedal reaction force for the first curve C1 is caused, the driver has already recognized the presence of the first curve C1. In this case, making the pedal reaction force for the second curve C2 smaller than the pedal reaction force for the first curve C1 allows less inconvenience of the driver.

[2-5. Continuous Curves Second Alert Control (Step S7 in FIG. 3)]

The continuous curves second alert control will now be described. As described above, the second curve C2 is not sharper than the first curve C1 in the continuous curves second alert control (refer to Steps S5 and S7 in FIG. 3). In other words, the degree of curve of the first curve C1 is higher than that of the second curve C2.

When the degree of curve of the first curve C1 is higher than that of the second curve C2, it is expected that the current vehicle speed V0 is lower than or equal to the recommended vehicle speed Vs2 for the second curve C2 when the vehicle 10 reaches the entrance-of-first-curve-C1 Pent1. Accordingly, only the alert of the first curve C1 is performed and the alert of the second curve C2 is not performed in the continuous curves second alert control in the first embodiment. The alert of the first curve C1 may be performed, for example, in the same manner as in the continuous curves first alert control (refer to Steps S11 to S20 in FIG. 6).

[2-6. Alert]

The method of alerting the first curve C1 and the second curve C2 in the first embodiment will now be described in more detail.

As described above, for example, at least one of the temporary change (for example, decrease) in the number of revolutions of the engine 30 or the traction motor 32, the temporary automatic braking with the brake device 14, the output of a warning tone from the speaker 54, the display of a warning on the touch panel 58, the temporary change (for example, increase) in the pedal reaction force against the acceleration pedal 70, and the temporary application of vibration to the steering wheel 80 may be used as the method of alerting the presence of the first curve C1 or the second curve C2 in the present embodiment. Any of the alert methods is temporarily (or instantaneously) performed when the own vehicle 10 reaches the alert start position Pst1 or Pst2. Accordingly, the alert is not continued once the alert has been performed.

However, the method of alerting the first curve C1 and the second curve C2 is not limited to the above examples and the alert may be continued or intermittently continued. In this case, Steps S19 and S26 in FIG. 6 may be omitted.

3. Advantages of First Embodiment

As described above, according to the first embodiment, it is possible to alert the presence of the second curve C2 following the first curve C1 (Step S27 in FIG. 6). In addition, since the alert timing (the alert distance Ld2') of the second curve C2 is set in accordance with the curve information about the first curve C1 (the degree of curve of the first curve C1), the presence of the second curve C2 is alerted in consideration of the effect of the first curve C1. Accordingly, it is possible to more appropriately alert the presence of the second curve C2 to the driver.

In the first embodiment, the vehicle speed monitoring ECU 24 decreases the recommended retardation Ds2 with the increasing degree of curve of the first curve C1 (for example, with the decreasing radius R1 of the first curve C1) (refer to FIG. 7) to advance the alert timing (shorten the alert distance Ld2') of the second curve C2 (refer to Equation (3)). Accordingly, when the first curve C1 is sharper, the driver recognizes the presence of the second curve C2 in an earlier stage. Consequently, it is possible for the driver to prepare the second curve C2 in the earlier stage.

In the first embodiment, if the radius R1 of the first curve C1 is smaller than the radius R2 of the second curve C2 (NO in Step S5 in FIG. 3), the vehicle speed monitoring ECU 24 does not alert the second curve C2 (Step S7). When the first curve C1 is sharper than the second curve C2, the retardation operation, etc. for the first curve C1 by the driver in response to the alert of the first curve C1 probably produces a traveling state that is capable of supporting the second curve C2. Accordingly, no alert for the second curve C2 is more convenient for the driver.

In the first embodiment, the vehicle speed monitoring ECU 24 sets the alert distance Ld2' for the second curve C2 in accordance with the recommended retardation Ds2' (refer to FIG. 7) resulting from correction of the recommended retardation Ds2 for the second curve C2 on the basis of the curve information about the first curve C1 (Steps S23 and S24 in FIG. 6). Accordingly, the alert distance Ld2 (including the alert distance Ld2' here) for the second curve C2 is set in consideration of the first curve C1. Consequently, it is possible to more appropriately set the alert timing of the second curve C2.

In the first embodiment, the ECU 24 increases the pedal reaction force against the acceleration pedal 70 and makes the pedal reaction force for the first curve C1 greater than that for the second curve C2 with the increasing sharpness of the first curve C1 or the second curve C2. Accordingly, it is possible for the driver to recognize the degree of curve of the first curve C1 or the second curve C2. In addition, when the pedal reaction force for the first curve C1 is caused, the driver has already recognized the presence of the first curve C1. In this case, making the pedal reaction force for the second curve C2 smaller than the pedal reaction force for the first curve C1 allows less inconvenience of the driver. The same applies to the other alert methods.

B. Second Embodiment

1. Difference from First Embodiment

Figure 8:
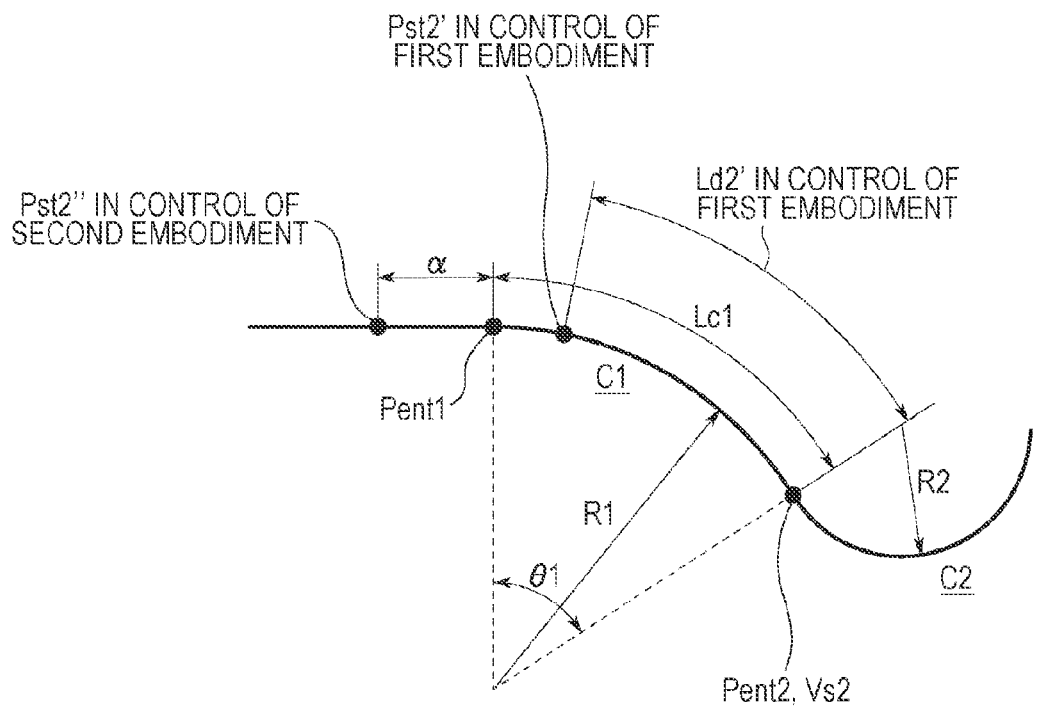
FIG. 8 is a diagram for describing the continuous curves first alert control according to a second embodiment.

FIG. 8 is a diagram for describing the continuous curves first alert control according to a second embodiment. The hardware configuration in the second embodiment is the same as that in the first embodiment (refer to FIG. 1). The same reference numerals are used in the second embodiment to identify the same components in the first embodiment. A description of such components is omitted herein.

The continuous curves first alert control (Step S6 in FIG. 3) in the second embodiment is partially different from that in the first embodiment (refer to FIG. 6). Specifically, in the first embodiment (FIG. 6), the alert distance Ld2' for the second curve C2 is lengthened in accordance with the degree of curve of the first curve C1. Accordingly, the drivability when the vehicle 10 travels along the second curve C2 is improved in consideration of the degree of curve of the first curve C1 while the alert is being performed for the multiple continuous curves (that is, the first curve C1 and the second curve C2).

However, as illustrated in FIG. 8, the alert start position Pst2' for the second curve C2 can be within the first curve C1 depending on a length Lc1 of the first curve C1 even if the alert distance Ld2' of the second curve C2 is lengthened.

When the second curve C2 is alerted while the own vehicle 10 is traveling along the first curve C1, the driver performs the retardation operation for the second curve C2 while the own vehicle 10 is traveling along the first curve C1. For example, when the degree of curve of the first curve C1 is high, the driver can feel the inconvenience due to such retardation operation. In addition, the alert of the second curve C2 at the entrance-of-first-curve-C1 Pent1 can possibly give a feeling of strangeness to the driver.

Accordingly, in the second embodiment, when the alert start position Pst2' of the second curve C2, which is calculated on the basis of the recommended retardation Ds2', is within the first curve C1 or immediately before the first curve C1, the alert start position Pst2' for the second curve C2 is moved toward the own vehicle 10 by a distance α from the entrance-of-first-curve-C1 Pent1 to use an alert start position Pst2".

2. Specific Flow

Figure 9:
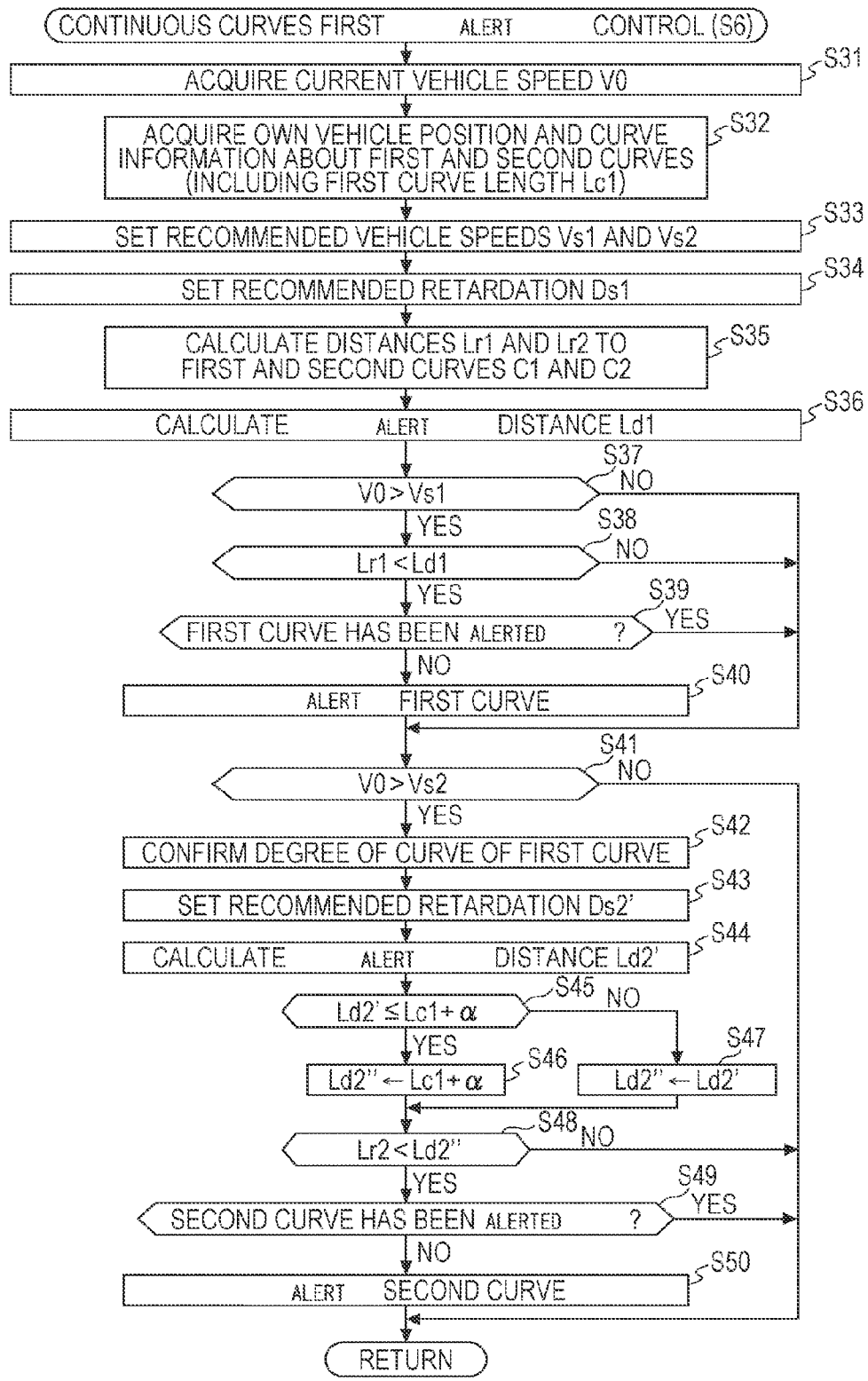
FIG. 9 is a flowchart illustrating an exemplary process of the continuous curves first alert control according to the second embodiment.

FIG. 9 is a flowchart illustrating an exemplary process of the continuous curves first alert control according to the second embodiment (Step S6 in FIG. 3). Steps S31 to S44 in FIG. 9 are the same as Steps S11 to S24 in the first embodiment (FIG. 6). However, in Step S32 in FIG. 9, the length Lc1 of the first curve C1 is included in the curve information acquired from the navigation device 16. The radius R1 and an angle θ1 (refer to FIG. 8) of the first curve C1 may be acquired, instead of the length Lc1, and the ECU 24 may calculate the length Lc1 of the first curve C1 from the radius R1 and the angle θ1 of the first curve C1.

Referring to FIG. 9, in Step S45, the ECU 24 (the alert distance calculating function 132) determines whether the alert distance Ld2' for the second curve C2 calculated in Step S44 is shorter than or equal to a sum Lc1+α of the length Lc1 of the first curve C1 and the certain distance α. The certain distance α is a value that is set in consideration of the possibility that the alert of the second curve C2 at the entrance-of-first-curve-C1 Pent1 may give a feeling of strangeness to the driver.

If the alert distance Ld2' is shorter than or equal to the Lc1+α (YES in Step S45), the alert start position Pst2' for the second curve C2 is within the first curve C1 or immediately before the entrance-of-first-curve-C1 Pent1. In this case, in Step S46, the ECU 24 (the alert distance calculating function 132) sets the sum Lc1+α as an alert distance Ld2".

If the alert distance Ld2' is not shorter than or equal to the Lc1+α (NO in Step S45), the alert start position Pst2' for the second curve C2 is located closer to the own vehicle 10 by a distance longer than the certain distance α from the entrance-of-first-curve-C1 Pent1. In this case, in Step S47, the ECU 24 (the alert distance calculating function 132) sets the alert distance Ld2' calculated in Step S44 as the alert distance Ld2".

In Step S48, the ECU 24 (the alert determining function 134) determines whether the distance Lr2 to the second curve C2 is shorter than the alert distance Ld2" calculated in Step S46 or S47. If the distance Lr2 is not shorter than the alert distance Ld2" (NO in Step S48), the current arithmetic process is terminated. If the distance Lr2 is shorter than the alert distance Ld2" (YES in Step S48), the process goes to Step S49.

Steps S49 and S50 in FIG. 9 are the same as Steps S26 and S27 in FIG. 6.

3. Advantages of Second Embodiment

As described above, the following advantages are achieved in the second embodiment, in addition to the advantages of the first embodiment.

Specifically, according to the second embodiment, the vehicle speed monitoring ECU 24 moves the alert start position Pst2' toward the own vehicle 10 with respect to the point apart from the first curve C1 by the distance α (Step S46) if the alert start position Pst2' based on the alert distance Ld2' set in accordance with the recommended retardation Ds2' is within the first curve C1 or within the distance α from the entrance-of-first-curve-C1 Pent1 (YES in Step S45). Accordingly, the alert of the second curve C2 is not made while the own vehicle 10 is traveling along the first curve C1 and the driver may drive easier the vehicle 10 while the own vehicle 10 is traveling along the first curve C1. In addition, even when the first curve C1 is sharp, it is possible to alert the presence of the second curve C2 to the driver before the own vehicle 10 enters the first curve C1.

When the first curve C1 is relatively long, the alert of the second curve C2 before the first curve C1 can reduce the recognition that the second curve C2 is alerted while the own vehicle 10 is traveling along the first curve C1. Accordingly, if the length Lc1 of the first curve C1 is greater than or equal to a certain value, the alert of the second curve C2 while the own vehicle 10 is traveling along the first curve C1 may allow the driver to appropriately recognize the second curve C2.

In this case, the alert of the second curve C2 may be limited so as to be made after the own vehicle 10 travels through the center of the first curve C1. The lateral acceleration at the first curve C1 is estimated to be maximized at the center of the first curve C1. Accordingly, bringing the driver's attention to the first curve C1 before the own vehicle 10 travels through the center of the first curve C1 and alerting the second curve C2 after the own vehicle 10 travels through the center of the first curve C1 allow the driver's attention to be appropriately brought to the second curve C2.

C. Third Embodiment

1. Difference from First and Second Embodiments

The hardware configuration in a third embodiment is the same as that in the first and second embodiments (refer to FIG. 1). The same reference numerals are used in the third embodiment to identify the same components in the first and second embodiments. A description of such components is omitted herein.

The continuous curves first alert control (Step S6 in FIG. 3) in the third embodiment is partially different from that in the first embodiment (refer to FIG. 6) and that in the second embodiment (refer to FIG. 9). Specifically, the alert distance Ld2' for the second curve C2 in the first embodiment and the alert distance Ld2" for the second curve C2 in the second embodiment result from adjustment of the alert distance Ld2 for the second curve C2 in accordance with the degree of curve of the first curve C1. In contrast, in the third embodiment, the alert distance Ld2 for the second curve C2 is adjusted in accordance with the degree of curve of the first curve C1, while the alert distance Ld1 for the first curve C1 is adjusted in accordance with the degree of curve of the second curve C2.

2. Specific Flow

Figure 10:
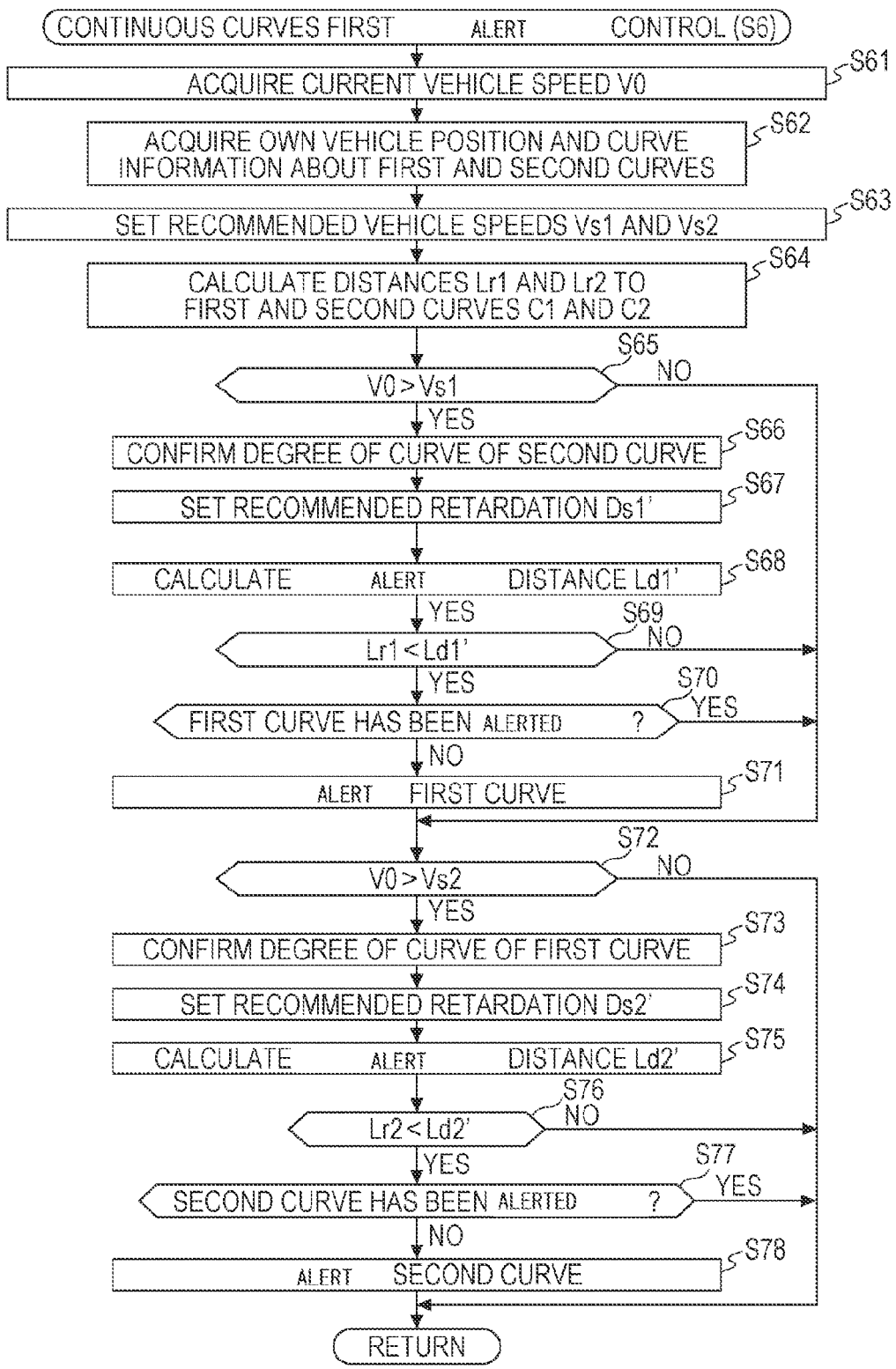
FIG. 10 is a flowchart illustrating an exemplary process of the continuous curves first alert control according to a third embodiment.

FIG. 10 is a flowchart illustrating an exemplary process of the continuous curves first alert control according to the third embodiment (Step S6 in FIG. 3). Steps S61 to S65 in FIG. 10 are the same as Steps S11 to S13, Step S15, and Step S17 in FIG. 6 and Steps S31 to S33, Step S35, and Step S37 in FIG. 9.

Referring to FIG. 10, in Step S66, the ECU 24 (the recommended retardation setting function 128) confirms the degree of curve of the second curve C2 in the same manner as in the confirmation of the degree of curve of the first curve C1 in Step S22 in FIG. 6 or Step S42 in FIG. 9.

For example, the radius R2 of the second curve C2 may be used as the degree of curve of the second curve C2. Alternatively, a quotient R1/R2 resulting from division of the radius R1 of the first curve C1 by the radius R2 of the second curve C2 may be used as the degree of curve of the second curve C2. Alternatively, a difference R1-R2 between the radius R1 of the first curve C1 and the radius R2 of the second curve C2 may be used as the degree of curve of the second curve C2.

As described above, the second curve C2 is sharper than the first curve C1 in the continuous curves first alert control (refer to Steps S5 and S6 in FIG. 3). Accordingly, the quotient R1/R2 is equal to a positive value greater than one and the difference R1-R2 is equal to a positive value.

In Step S67, the ECU 24 (the recommended retardation setting function 128) sets the recommended retardation Ds1' for the first curve C1 in accordance with the degree of curve of the second curve C2 in the same manner as in Step S23 in FIG. 6.

The relationship between the degree of curve of the second curve C2 and the recommended retardation Ds1' for the first curve C1 is the same as the relationship between the degree of curve of the first curve C1 and the recommended retardation Ds2' for the second curve C2 illustrated in FIG. 7. Specifically, the recommended retardation Ds1' is decreased with the increasing degree of curve of the second curve C2. When the degree of curve of the second curve C2 is higher, an alert distance Ld1' for the first curve C1 is further lengthened as the result of processing described below to alert the first curve C1 earlier.

Referring back to FIG. 10, in Step S68, the ECU 24 (the alert distance calculating function 132) calculates the alert distance Ld1' for the first curve C1. Specifically, the current vehicle speed V0 acquired in Step S61, the recommended vehicle speed Vs2 set in Step S63, and the recommended retardation Ds1' set in Step S67 are substituted into Equation (3) to calculate the alert distance Ld1'.

As described above, since the degree of curve of the second curve C2 is reflected in the recommended retardation Ds1', the degree of curve of the second curve C2 is reflected also in the alert distance Ld1'. As described below, the alert distance Ld1' for the first curve C1 may be set by another method.

In Step S69, the ECU 24 (the alert determining function 134) determines whether the distance Lr1 to the first curve C1 is shorter than the alert distance Ld1' calculated in Step S68. If the distance Lr1 to the first curve C1 is not shorter than the alert distance Ld1' (NO in Step S69), the process goes to Step S72. If the distance Lr1 to the first curve C1 is shorter than the alert distance Ld1' (YES in Step S69), the process goes to Step S70.

Steps S70 to S78 in FIG. 10 are the same as Steps S19 to S27 in FIG. 6.

3. Advantages of Third Embodiment

As described above, the following advantages are achieved in the third embodiment, in addition to the advantages of the first and second embodiments or instead of the advantages thereof.

According to the third embodiment, the vehicle speed monitoring ECU 24 sets the alert timing (the alert distance Ld1') of the first curve C1 in accordance with the curve information about the second curve C2 (the degree of curve of the second curve C2). Since the alert timing of the first curve C1 is set in accordance with the curve information about the second curve C2, the presence of the first curve C1 is alerted in consideration of the effect of the second curve C2. Consequently, it is possible to more appropriately alert the presence of the first curve C1 to the driver.

The ECU 24 advances the alert timing of the first curve C1 with the decreasing radius R2 of the second curve C2. Accordingly, it is possible to alert to the driver that more attention is necessary, compared with a case in which a single curve exists ahead of the own vehicle, to improve the drivability.

D. Modifications

While the preferred embodiments of the present disclosure have been described above, it will be recognized and understood that various modifications can be made in the present disclosure. For example, the following configurations may be adopted.

1. Coverage

Although the vehicle 10 is a hybrid vehicle including both the engine 30 and the traction motor 32 in the above embodiments, the vehicle 10 may be a gasoline engine vehicle or a diesel engine vehicle, which does not include the traction motor 32, or an electric automobile (including a fuel cell vehicle) which does not include engine 30. Although the vehicle 10 is described as a four-wheeled vehicle in the above embodiments, the vehicle 10 may be a two-wheeled vehicle, a three-wheeled vehicle, a six-wheeled vehicle, or the like.

2. Curve Alert Control

[2-1. Entire Flow]

Although the continuous curves first alert control is performed only when the second curve C2 is sharper than the first curve C1 (Step S5 and S6 in FIG. 3) in the above embodiments, the continuous curves first alert control may be performed when the second curve C2 is not shaper than the first curve C1. In this case, the continuous curves second alert control is not performed.

[2-2. Continuous Curves First Alert Control]

(2-2-1. Alert Distances Ld1 and Ld2)

(2-2-1-1. Recommended Retardations Ds1 and Ds2)

Although the recommended retardation Ds2 (including the recommended retardation Ds2' after correction here) for the second curve C2 is set in accordance with the degree of curve of the first curve C1 in the above embodiments, other setting methods may be used as long as the recommended retardation Ds2 for the second curve C2 is set in accordance with the curve information about the first curve C1.

Figure 11:
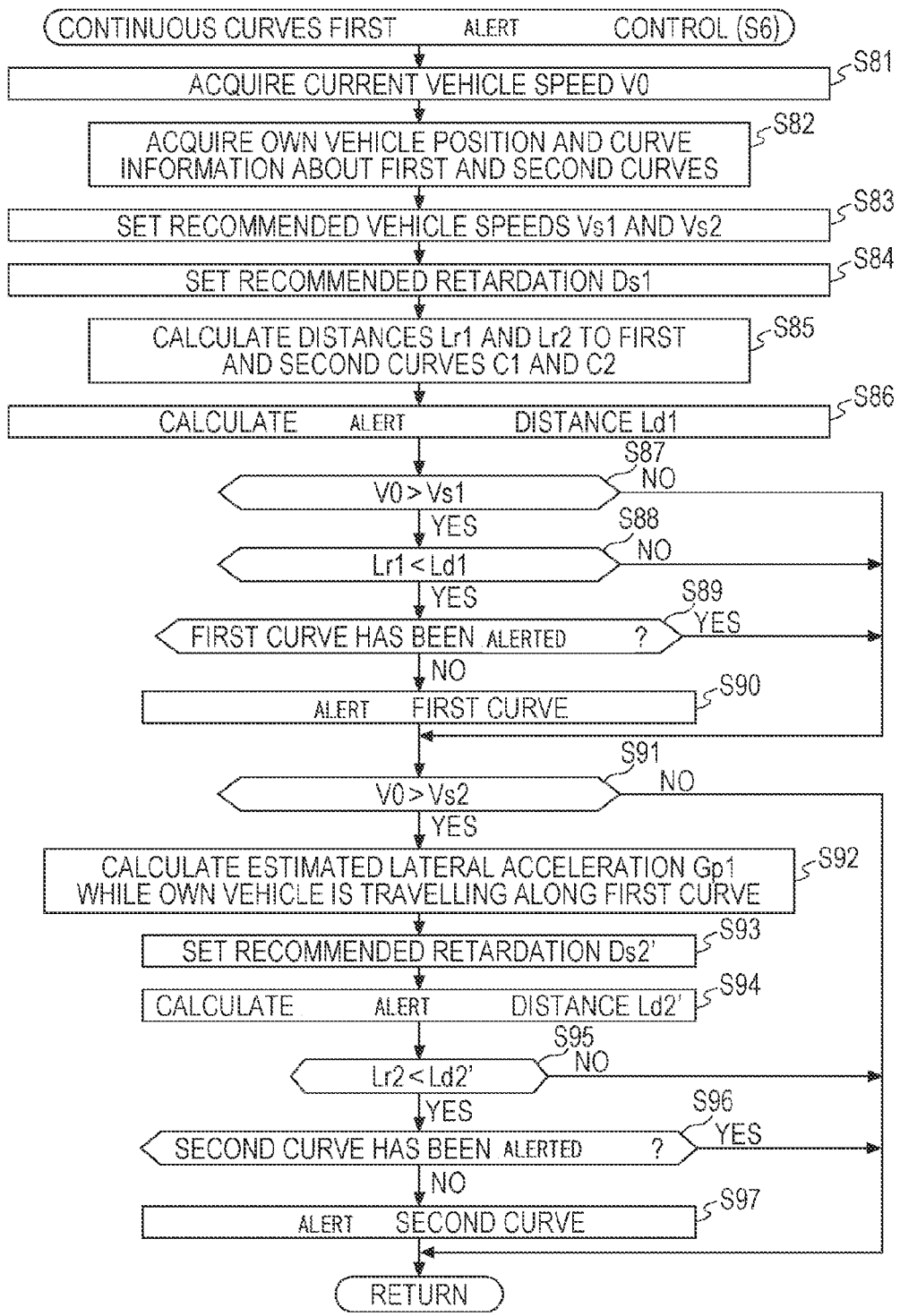
FIG. 11 is a flowchart illustrating an exemplary process of the continuous curves first alert control according to a first modification.

FIG. 11 is a flowchart illustrating an exemplary process of the continuous curves first alert control according to a first modification (Step S6 in FIG. 3). Steps S81 to S91 in FIG. 11 are the same as Steps S11 to S21 in FIG. 6.

Referring to FIG. 11, in Step S92, the ECU 24 (the recommended retardation setting function 128) calculates an estimated lateral acceleration Gp1 while the own vehicle 10 is traveling along the first curve C1. The estimated lateral acceleration Gp1 is the lateral acceleration estimated to occur when the own vehicle 10 travels through the first curve C1. In the first modification, the estimated lateral acceleration Gp1 is calculated according to Equation (6):

$$Gp1 = (Vc1)^2/R1 \quad (6)$$

In Equation (6), Vc1 denotes an estimated value of the vehicle speed V0 when the own vehicle 10 travels through the first curve C1 and R1 denotes the radius of the first curve C1, as described above. The vehicle speed V0 at this time point (the time when the estimated lateral acceleration Gp1 is calculated) is used as the estimated vehicle speed Vc1.

In Step S93, the ECU 24 (the recommended retardation setting function 128) sets the recommended retardation Ds2' for the second curve C2 in accordance with the estimated lateral acceleration Gp1 calculated in Step S92. As described above, the recommended retardation Ds2' is a value resulting from correction of the recommended retardation Ds in accordance with the curve information about the first curve C1.

Figure 12:
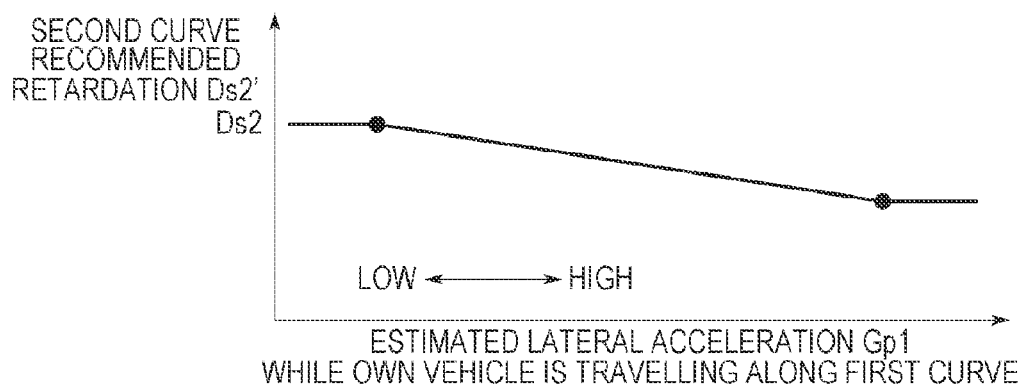
FIG. 12 illustrates an example of the relationship between an estimated lateral acceleration while an own vehicle is traveling along the first curve and the recommended retardation for the second curve in the first modification.

FIG. 12 illustrates an example of the relationship between the estimated lateral acceleration Gp1 while the own vehicle 10 is traveling along the first curve C1 and the recommended retardation Ds2' for the second curve C2 in the first modification. As illustrated in FIG. 12, the recommended retardation Ds2' is decreased with the increasing estimated lateral acceleration Gp1. When the estimated lateral acceleration Gp1 is higher, the alert distance Ld2' for the second curve C2 is further lengthened as the result of processing described below to alert the second curve C2 earlier.

Referring back to FIG. 11, in Step S94, the ECU 24 (the alert distance calculating function 132) calculates the alert distance Ld2' for the second curve C2. Specifically, the current vehicle speed V0 acquired in Step S81, the recommended vehicle speed Vs2 set in Step S83, and the recommended retardation Ds2' set in Step S93 are substituted into Equation (3) to calculate the alert distance Ld2'.

Since the estimated lateral acceleration Gp1 is reflected in the recommended retardation Ds2', as described above, the estimated lateral acceleration Gp1 is reflected also in the alert distance Ld2'.

The vehicle speed monitoring ECU 24 according to the first modification in FIG. 11 advances the alert timing of the second curve C2 with the increasing estimated lateral acceleration Gp1 of the first curve C1 calculated in Step S92. Accordingly, information of how the first curve C1 is sharp is acquired on the basis of the estimated lateral acceleration Gp1 estimated to occur when the own vehicle 10 travels through the first curve C1. Consequently, it is possible to set the alert timing of the second curve C2 on the basis of the above information to appropriately alert the second curve C2 to the driver before the own vehicle 10 travels along the second curve C2.

(2-2-1-2. Recommended Vehicle Speeds Vs1 and Vs2)

Although the recommended retardation Ds2 (including the recommended retardation Ds2' after correction here) for the second curve C2 is set in accordance with the degree of curve of the first curve C1 in the above embodiments, other setting methods may be used as long as the alert distance Ld2 (including the alert distance Ld2' and the alert distance Ld2" after correction) for the second curve C2 is set in accordance with the curve information about the first curve C1. For example, the recommended vehicle speed Vs2 for the second curve C2 may be corrected in accordance with the degree of curve of the first curve C1.

Figure 13:
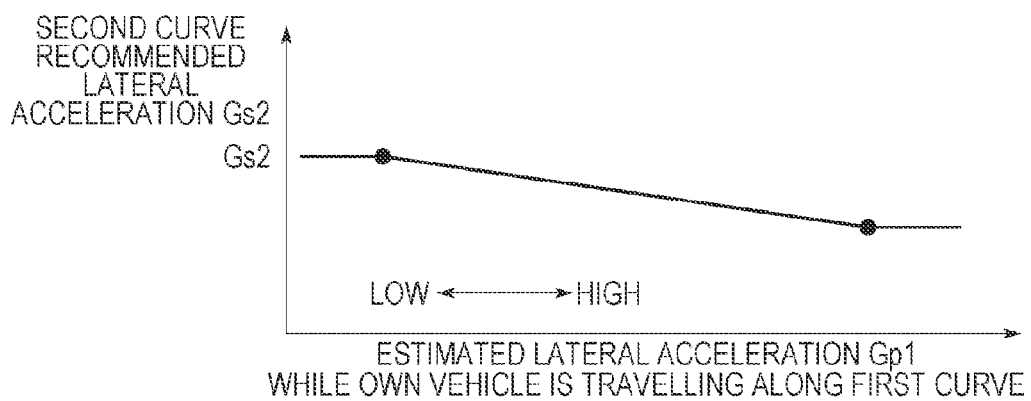
FIG. 13 illustrates an example of the relationship between the estimated lateral acceleration while the own vehicle is traveling along the first curve and a recommended lateral acceleration for the second curve according to a second modification.

FIG. 13 illustrates an example of the relationship between the estimated lateral acceleration Gp1 while the own vehicle 10 is traveling along the first curve C1 and a recommended lateral acceleration Gs2 for the second curve C2 according to a second modification. The estimated lateral acceleration Gp1 is calculated in the above manner. The recommended lateral acceleration Gs2 is the lateral acceleration recommended when the own vehicle 10 travels through the second curve C2. As illustrated in FIG. 13, the recommended lateral acceleration Gs2 is decreased with the increasing estimated lateral acceleration Gp1.

The recommended vehicle speed Vs2 is calculated according to Equation (7):

$$Vs2 = \sqrt{(R2 * Gs2)} \quad (7)$$

In Equation (7), R2 denotes the radius of the second curve C2 and Gs2 denotes the recommended lateral acceleration described above. According to Equation (7), the recommended vehicle speed Vs2 is decreased with the decreasing recommended lateral acceleration Gs2. Accordingly, as illustrated in FIG. 13, the recommended vehicle speed Vs2 for the second curve C2 is decreased as the result of processing described below with the increasing estimated lateral acceleration Gp1 to lengthen the alert distance Ld2' (refer to Equation (3)), thereby alerting the second curve C2 earlier.

When the relationship illustrated in FIG. 13 is used, the recommended retardation Ds2 for the second curve C2 is set, for example, in the same manner as in the recommended retardation Ds1 for the first curve C1 in Step S14 in FIG. 6.

The horizontal axis in FIG. 13 may be changed from the "estimated lateral acceleration Gp1" to the "degree of curve of the first curve C1."

(2-2-2. Other Modifications)

In the second embodiment (FIG. 9), the sum Lc1+α is set as the alert distance Ld2" (Step S46) if the alert distance Ld2' for the second curve C2 is shorter than or equal to the sum Lc1+α of the length Lc1 of the first curve C1 and the certain distance α (YES in Step S45). However, it may be determined whether the alert distance Ld2' for the second curve C2 is shorter than or equal to the length Lc1 of the first curve C1 without using the certain distance α. The length Lc1 of the first curve C1 may be set as the alert distance Ld2" if the alert distance Ld2' is shorter than or equal to the length Lc1 of the first curve C1.

In the first and second embodiments, the alert distance Ld2 (including the alert distance Ld2' and the alert distance Ld2" after correction here) for the second curve C2, which has an effect on the alert timing, is set on the basis of the curve information about the first curve C1. In the third embodiment, the alert distance Ld2 for the second curve C2, which has an effect on the alert timing, is set on the basis of the curve information about the first curve C1 and the alert distance Ld1 (including the alert distance Ld1' after correction here) for the first curve C1 is set on the basis of the curve information about the second curve C2. The alert distance Ld1 for the first curve C1 may be set on the basis of the curve information about the second curve C2 without setting the alert distance Ld2 for the second curve C2 on the basis of the curve information about the first curve C1.

Figure 14:
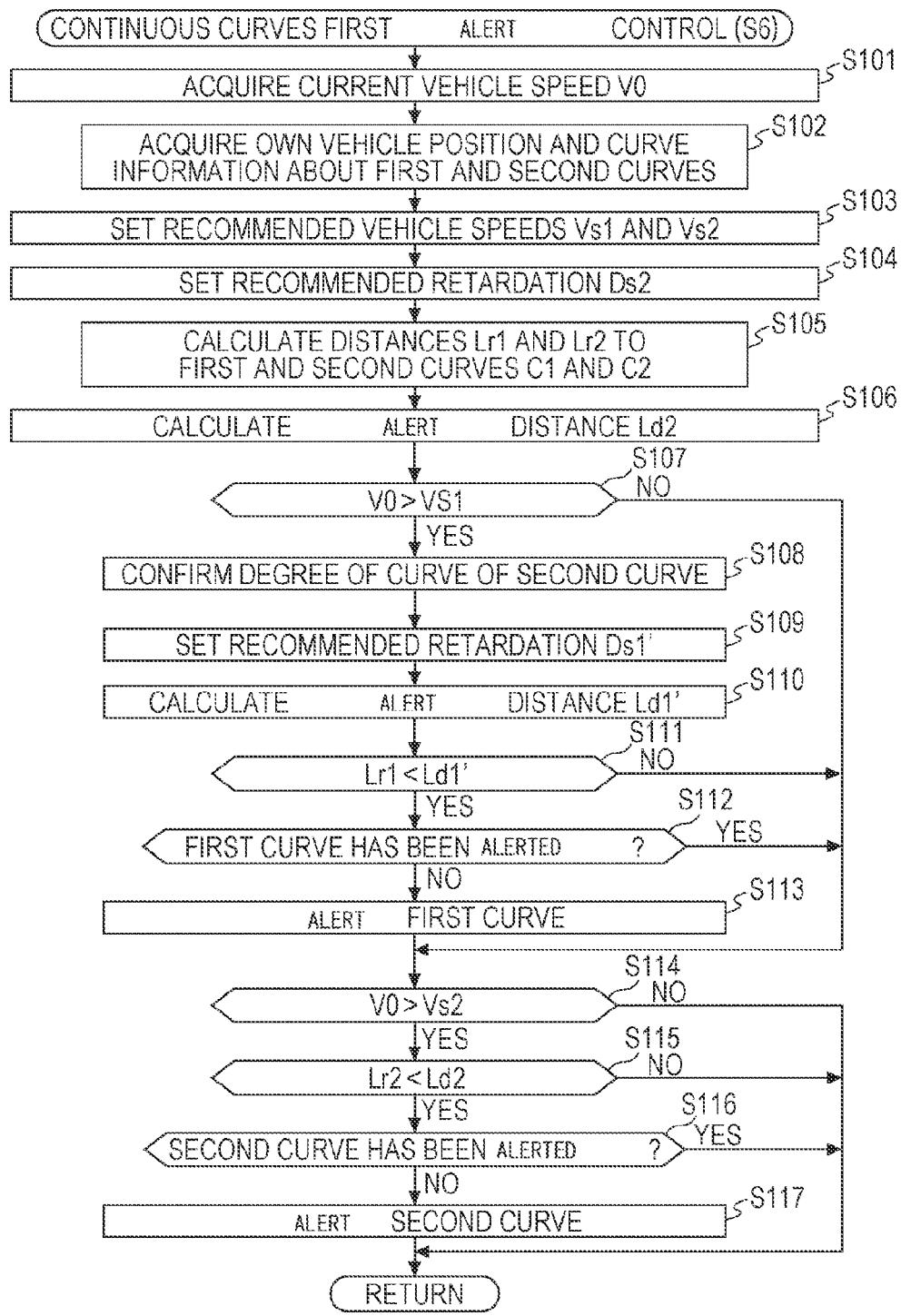
FIG. 14 is a flowchart illustrating an exemplary process of the continuous curves first alert control according to a third modification.

FIG. 14 is a flowchart illustrating an exemplary process of the continuous curves first alert control according to a third modification (Step S6 in FIG. 3). Steps S101 to S103 in FIG. 14 are the same as Steps S11 to S13 in FIG. 6.

Referring to FIG. 14, in Step S104, the ECU 24 (the recommended retardation setting function 128) sets the recommended retardation Ds2 for the second curve C2 in the same manner as in the recommended retardation Ds1 for the first curve C1 in Step S14 in FIG. 6. Step S105 in FIG. 14 is the same as Step S15 in FIG. 6. In Step S106, the ECU 24 (the alert distance calculating function 132) calculates the alert distance Ld2 for the second curve C2 in the same manner as in the alert distance Ld1 for the first curve C1 in Step S16 in FIG. 6.

Steps S107 to S114 in FIG. 14 are the same as Steps S65 to S72 in FIG. 10.

In Step S115, the ECU 24 (the alert determining function 134) determines whether the distance Lr2 to the second curve C2 is shorter than the alert distance Ld2. If the distance Lr2 is not shorter than the alert distance Ld2 (NO in Step S115), the current arithmetic process is terminated. If the distance Lr2 is shorter than the alert distance Ld2 (YES in Step S115), the process goes to Step S116.

Steps S116 and S117 in FIG. 14 are the same as Steps S26 and S27 in FIG. 6.

[2-3. Alert of First Curve C1 and Second Curve C2]

At least one of the temporary change (for example, decrease) in the number of revolutions of the engine 30 or the traction motor 32, the temporary automatic braking with the brake device 14, the output of a warning tone from the speaker 54, the display of a warning on the touch panel 58, the temporary change (for example, increase) in the pedal reaction force against the acceleration pedal 70, and the temporary application of vibration to the steering wheel 80 may be used as the exemplary method of alerting the first curve C1 and the second curve C2 in the above embodiments. However, other method may be used as long as the first curve C1 and the second curve C2 are alerted. For example, the alert may be performed on a head-up display (HUD) (not illustrated), instead of the touch panel 58 in the navigation device 16 or in addition to the touch panel 58 in the navigation device 16.

[2-4. Others]

Although it is assumed in the above embodiments (FIG. 5 and FIG. 8) that the direction of turn of the first curve C1 is opposite to that of the second curve C2, it may be determined that multiple continuous curves exist if, for example, the multiple continuous curves are different in radius or curvature from each other even when the curves have the same direction of turn.

FIG. 15 illustrates an example of the first curve C1 and the second curve C2 having the same direction of turn. In the example in FIG. 15, the first curve C1 has the same direction of turn as that of the second curve C2 while the radius R1 of the first curve C1 is different from the radius R2 of the second curve C2 (the radius R1 is greater than the radius R2). Accordingly, the first curve C1 and the second curve C2 may be processed as continuous curves in which the degree of curve of the second curve C2 is higher than that of the first curve C1 and, thus, the continuous curves first alert control described above may be used.

Although the case in which the first curve C1 and the second curve C2 are continuous curves, that is, the two curves exist is described in the above embodiments, the present disclosure is applicable to a case in which three or more curves exist. For example, when a third curve C3 exists subsequent to the second curve C2, the relationship between the first curve C1 and the second curve C2 may be applied between the second curve C2 and the third curve C3 to embody the present disclosure.

I claim:

1. A driving assistance control apparatus comprising:
   an own-vehicle position acquiring unit acquiring a current position of an own vehicle;
   a curve information acquiring unit acquiring curve information on a driving course;
   a continuous curves detecting unit detecting continuous curves including a first curve existing ahead of the own vehicle and a second curve existing ahead of and continuous to the first curve, the continuous curves detecting unit detecting the continuous curves using the position of the own vehicle acquired by the own-vehicle position acquiring unit and the curve information acquired by the curve information acquiring unit; and
   a curve alert control unit controlling a curve alerting unit alerting the presence of the first curve, and alerting the presence of the second curve before entering the second curve, the curve alerting unit alerting by using one of alerting methods consisting of a temporary change in the number of revolutions of an engine or a traction motor, applying temporary automatic braking, outputting a warning tone from a speaker, displaying a warning, a temporary change in a pedal reaction force against an acceleration pedal, and applying temporary vibration to a steering wheel,
   wherein the curve alert control unit sets an alert timing of the presence of the second curve in accordance with the curve information about the first curve, wherein the curve alert control unit advances the alert timing of the presence of the second curve with the increasing degree of curve of the first curve,
   wherein the curve alert control unit sets a first alert start position at which alerting of the presence of the first curve is started, the first alert start position being set to a position before an entrance of the first curve,
   wherein the curve alert control unit obtains a second alert start position corresponding to the alert timing of the presence of the second curve, separately from the first alert start position,
   wherein the curve alert control unit performs a first determination of whether a radius of the first curve is smaller than that of the second curve or whether a curvature of the first curve is higher than that of the second curve, and if the first determination is affirmative, does not alert the presence of the second curve.

2. The driving assistance control apparatus according to claim 1,
   wherein the curve alert control unit advances the alert timing of the presence of the second curve with the decreasing radius of the first curve or with the increasing curvature of the first curve.

3. The driving assistance control apparatus according to claim 1, further comprising:
   a recommended vehicle speed setting unit setting a recommended vehicle speed at the entrance of the first curve; and
   an estimated lateral acceleration acquiring unit acquiring an estimated lateral acceleration estimated to occur when the own vehicle travels through the first curve on the basis of the recommended vehicle speed set by the recommended vehicle speed setting unit and the curve information about the first curve,
   wherein the curve alert control unit advances the alert timing of the presence of the second curve with the increasing degree of the estimated lateral acceleration for the first curve acquired by the estimated lateral acceleration acquiring unit.

4. The driving assistance control apparatus according to claim 1,
   wherein the curve alert control unit performs a first determination of whether a radius of the first curve is smaller than that of the second curve or whether a curvature of the first curve is higher than that of the second curve, and if the first determination is affirmative, does not alert the presence of the second curve.

5. The driving assistance control apparatus according to claim 1,
   wherein the curve alerting unit alerts the presence of the first curve before the entrance of the first curve, and
   wherein the curve alert control unit sets the alert timing of the presence of the first curve in accordance with the curve information about the second curve.

6. The driving assistance control apparatus according to claim 5,
   wherein the curve alert control unit advances the alert timing of the presence of the first curve with the decreasing radius of the second curve or with the increasing curvature of the second curve.

7. The driving assistance control apparatus according to claim 1,
   wherein the curve alert control unit obtains a recommended vehicle speed at the entrance of the second curve or a recommended retardation to achieve the recommended vehicle speed at the entrance of the second curve, calibrates at least one of the recommended vehicle speed at the entrance of the second curve and the recommended retardation on the basis of the curve information about the first curve, and sets an alert distance from the entrance of the second curve to a position where the presence of the second curve is alerted, in accordance with the calibrated recommended vehicle speed or the calibrated recommended retardation.

8. The driving assistance control apparatus according to claim 7,
wherein the curve alert control unit performs a second determination of whether an alert start position obtained based on the alert distance set in accordance with the calibrated recommended vehicle speed or the calibrated recommended retardation is located within the first curve, and if the second determination is affirmative, moves the alert start position to a position at the entrance of the first curve or before the first curve.

9. The driving assistance control apparatus according to claim 8, further comprising:
a curve length acquiring unit acquiring a length of the first curve,
wherein the curve alert control unit performs a third determination of whether the length of the first curve is greater than or equal to a certain value, and if the third determination is affirmative, uses the alert start position within the first curve even when the second determination is affirmative.

10. The driving assistance control apparatus according to claim 5, further comprising:
a reaction force generating unit providing alerting reaction force against an acceleration pedal as the alert of the presence of the first curve or the second curve,
wherein the curve alert control unit increases the alerting reaction force with the increasing degree of curve of the first curve or the second curve and makes the alerting reaction force for the first curve greater than that for the second curve.

11. The driving assistance control apparatus according to claim 1, wherein the curve alerting unit decides the alert timing to alert the presence of the second curve ahead of the own vehicle, and wherein the curve alert control unit calibrates the alerting timing decided by the curve alerting unit in accordance with the curvature of the first curve.

12. The driving assistance control apparatus according to claim 5, wherein the curve alerting unit decides the alert timing to alert the presence of the first curve ahead of the own vehicle, and wherein the curve alert control unit calibrates the alerting timing decided by the curve alerting unit in accordance with the curvature of the second curve.

13. A driving assistance control method comprising:
a) acquiring a position of an own vehicle;
b) acquiring curve information on a driving course;
c) detecting, using a processor, continuous curves including a first curve existing ahead of the own vehicle and a second curve existing ahead of and continuous to the first curve, by using the position of the own vehicle acquired by the step a) and the curve information acquired by the step b); and
d) setting, using a processor, a first alert start position at which alerting of the presence of the first curve is started, the first alert start position being set to a position before an entrance of the first curve;
e) alerting, using a processor, the presence of the second curve before entering the second curve at an alerting timing by using one of alerting methods consisting of a temporary change in the number of revolutions of an engine or a traction motor, applying temporary automatic braking, outputting a warning tone from a speaker, displaying a warning, a temporary change in a pedal reaction force against an acceleration pedal, and applying temporary vibration to a steering wheel, wherein the alert timing of the presence of the second curve is set in accordance with the curve information about the first curve such that the alert timing of the presence of the second curve is advanced with the increasing degree of curve of the first curve,
wherein the step e) obtains a second alert start position corresponding to the alert timing of the presence of the second curve, determines whether the second alert start position is located within the first curve, and if so, changes the second alert start position to a position before the entrance of the first curve.

* * * * *